(12) United States Patent
Wang et al.

(10) Patent No.: US 9,832,797 B2
(45) Date of Patent: Nov. 28, 2017

(54) MOBILITY NETWORK FUNCTION CONSOLIDATION

(71) Applicant: AT&T INTELLECTUAL PROPERTY I, LP, Atlanta, GA (US)

(72) Inventors: Jiansong Wang, Parlin, NJ (US); Ryan Redfern, Cerritos, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 84 days.

(21) Appl. No.: 14/753,390

(22) Filed: Jun. 29, 2015

(65) Prior Publication Data

US 2016/0381662 A1    Dec. 29, 2016

(51) Int. Cl.
| | |
|---|---|
| *H04W 88/16* | (2009.01) |
| *H04W 8/06* | (2009.01) |
| *H04W 84/04* | (2009.01) |
| *H04W 12/00* | (2009.01) |
| *H04W 76/02* | (2009.01) |

(52) U.S. Cl.
CPC ......... *H04W 76/022* (2013.01); *H04W 12/00* (2013.01); *H04W 8/06* (2013.01); *H04W 84/045* (2013.01); *H04W 88/16* (2013.01)

(58) Field of Classification Search
CPC ..... H04W 72/04; H04W 66/16; H04W 88/16; H04W 8/06; H04W 84/045; H04W 12/00; H04W 76/022
See application file for complete search history.

(56) References Cited

U.S. PATENT DOCUMENTS

| | | | |
|---|---|---|---|
| 7,742,436 B2 | 6/2010 | Carrillo et al. | |
| 7,843,900 B2 | 11/2010 | Gallagher et al. | |
| 7,899,451 B2 | 3/2011 | Hu et al. | |
| 8,406,733 B2 | 3/2013 | Raleigh et al. | |
| 8,442,030 B2 | 5/2013 | Dennison et al. | |
| 8,494,529 B2 | 7/2013 | Kim et al. | |

(Continued)

FOREIGN PATENT DOCUMENTS

| | | |
|---|---|---|
| CA | 2833679 A1 | 11/2012 |
| WO | 2010132826 A2 | 11/2010 |

(Continued)

OTHER PUBLICATIONS

Hui, Jonathan W. et al., "IP is dead, long live IP for wireless sensor networks", Proceedings of the 6th ACM conference on Embedded network sensor systems. ACM (2008)

(Continued)

*Primary Examiner* — Phirin Sam
*Assistant Examiner* — Debebe Asefa
(74) *Attorney, Agent, or Firm* — Guntin & Gust, PLC; Ralph Trementozzi

(57) ABSTRACT

Aspects of the subject disclosure may include, for example, control signals are communicated with a base station of a radio access network in communication with a mobile device. The control signals include information associated with one of mobility of the mobile device, bearer management or both. The network node communicates bearer message traffic with the base station and coordinates an exchange of data packets between the base station and an external packet data network by way of the bearer message traffic. Other embodiments are disclosed.

20 Claims, 16 Drawing Sheets

(56) References Cited

U.S. PATENT DOCUMENTS

| | | | |
|---|---|---|---|
| 8,537,829 B2 * | 9/2013 | Mehta | H04W 28/02 370/229 |
| 8,730,796 B2 | 5/2014 | Samuel et al. | |
| 8,787,909 B2 | 7/2014 | Kim et al. | |
| 8,817,696 B2 | 8/2014 | Shatzkamer et al. | |
| 8,982,841 B2 | 3/2015 | Srinivasan | |
| 8,989,139 B2 | 3/2015 | Wu et al. | |
| 2004/0010612 A1 | 1/2004 | Pandya | |
| 2008/0076393 A1 | 3/2008 | Khetawat et al. | |
| 2012/0259985 A1 | 10/2012 | Koskela et al. | |
| 2013/0287012 A1 * | 10/2013 | Pragada | H04W 76/045 370/338 |
| 2014/0086177 A1 * | 3/2014 | Adjakple | H04W 12/08 370/329 |
| 2014/0307556 A1 | 10/2014 | Zhang et al. | |
| 2014/0362700 A1 | 12/2014 | Zhang | |
| 2014/0362730 A1 | 12/2014 | Zhang | |
| 2014/0362775 A1 | 12/2014 | Steiner | |
| 2014/0372591 A1 | 12/2014 | Payette | |
| 2015/0055623 A1 | 2/2015 | Li et al. | |
| 2015/0117408 A1 | 4/2015 | Kedalagudde | |

FOREIGN PATENT DOCUMENTS

| | | |
|---|---|---|
| WO | 2014101887 A1 | 7/2014 |
| WO | 2015065701 | 5/2015 |

OTHER PUBLICATIONS

Pentikousis, Kostas et al., "Mobileflow: Toward software-defined mobile networks", Communications Magazine, IEEE 51.7 (2013): 4453.

Salkintzis, Apostolis K. et al., "WLAN-GPRS integration for next-generation mobile data networks", Wireless Communications, IEEE 9.5 (2002): 112124.

Sama, Malla Reddy et al., "Software-defined control of the virtualized mobile packet core", Communications Magazine, IEEE 53.2 (2015): 107115.

* cited by examiner

100

200

400a

500

600

700

US 9,832,797 B2

MOBILITY NETWORK FUNCTION CONSOLIDATION

FIELD OF THE DISCLOSURE

The subject disclosure relates to mobility network function consolidation.

BACKGROUND

With increasingly widespread deployment of advanced wireless mobile networks, such as 3$^{rd}$ Generation Partnership Project (3GPP) Long-Term Evolution (LTE) network and Universal Mobile Telecommunications System (UMTS) architectures, these networks are replacing wired networks as the main access networks of choice. Wireless mobile network architectures generally include a radio access portion, a core network portion, and in at least some instances, an analysis or monitoring portion. Each of the different wireless network portions, in turn, includes one or more nodal functions that collectively support delivery of various services to equipment of mobile users, or subscribers.

The nodal functions are generally defined independently, e.g., by applicable 3GPP standards. In addition to the nodal functions, interface boundaries are also defined by the standards to support interactions between the different nodal functions. This standardization approach has promoted a multi-vendor environment, in which different equipment developers and/or vendors develop different equipment, i.e., "boxes," that adhere to particular nodal function(s). Consequently, this approach has resulted in organizational partitions at virtually every level, e.g., from development to marketing, sales and support.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for consolidation of multiple mobility network functions within a single device of a standards-compliant mobility network architecture. Other embodiments are described in the subject disclosure.

One or more aspects of the subject disclosure include a consolidated platform that supports multiple nodal functions of a wireless communications network. The consolidated platform can include a consolidated Wireless Control Plane Plexus (WCPP) that supports the integrated 3GPP mobility control plane functions for one or more of a radio access network, an evolved packet core and mobile network analytics.

One embodiment of the subject disclosure includes a device including a processor and a memory that stores executable instructions. The instructions, when executed by the processor, facilitate performance of operations that include communicating signaling message traffic with a base station of a radio access network in communication with a mobile communication device. The signaling message traffic includes information associated with one of mobility management processing, bearer management or both of an evolved packet core. Bearer message traffic is communicated with the base station and an exchange of data packets is coordinated between the base station and an external packet data network via a gateway by way of the bearer message traffic.

Another embodiment of the subject disclosure includes a process that includes communicating, by a network device including a processor, control signals with a base station of a radio access network in communication with a mobile device. The control signals include information associated with one of mobility of the mobile device, bearer management or both. The network node communicates bearer message traffic with the base station. An exchange of data packets is coordinated between the base station and an external packet data network by way of the bearer message traffic.

Yet another embodiment of the subject disclosure includes a machine-readable storage medium that includes executable instructions which, responsive to being executed by a processor, cause the processor to perform operations. The operations include communicating control information with a wireless access terminal. The control information includes information associated with one of mobility management processing, bearer management or both of a mobile communication device in communication with the wireless access terminal. Data is communicated with the mobile communication device by way of a bearer having an associated session context. An exchange of the data is coordinated between the wireless access terminal and an external packet data network by way of the bearer.

Figure 1:
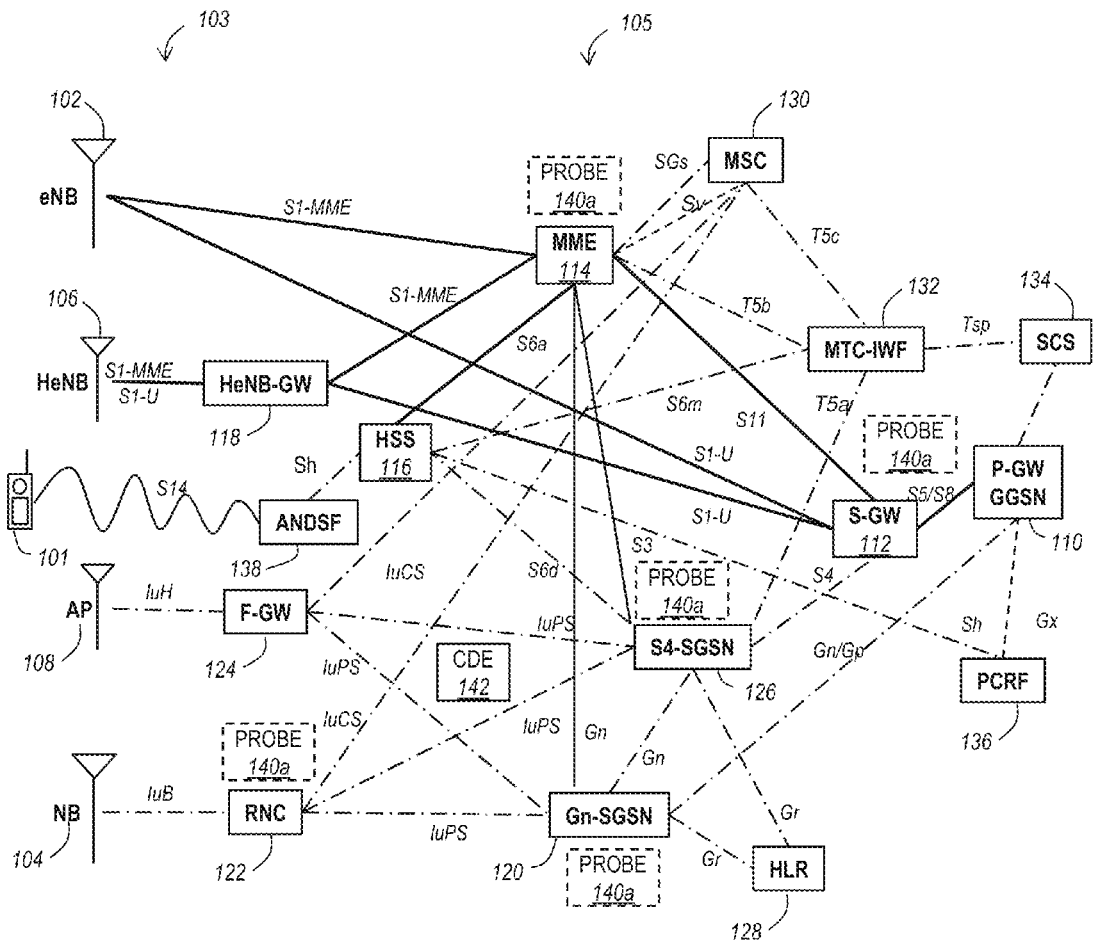
FIG. 1 depicts an illustrative embodiment of a communications network.

FIG. 1 depicts an illustrative embodiment of a mobile communications system 100. Among other features, the system 100 assigns and controls wireless links that provide network connections for wireless mobile devices 101. Functionality of the system 100 is distributed across multiple network nodes, each performing one or more nodal functions that collectively deliver service capabilities to the mobile devices 101. The nodes exchange information with other nodes according prescribed interfaces, sometimes referred to as reference points.

At least some parts of the system 100 conform to one or more aspects of various standard configurations or architectures, e.g., 3GPP standards. Mobile communications network configurations include, without limitation: Global System for Mobile Communications (GSM), a $2^{nd}$ generation digital cellular network; Universal Mobile Telecommunications System (UMTS), a $3^{rd}$ generation mobile cellular system for networks based on the GSM standard; and Long-Term Evolution (LTE), sometimes referred to as a $4^{th}$ generation wireless communication standard.

The nodes of the system 100 can be grouped into a Radio Access Network (RAN) portion 103 and a Core Network (CN) portion 105. The RAN 103 provides communications connectivity between the mobile device 101, sometimes referred to as User Equipment (UE), and the CN 105. In some embodiments, the RAN 103 comprises an Evolved Universal Terrestrial Radio Access Network (E-UTRAN), and the CN 105 comprises an Evolved Packet Core (EPC). The E-UTRAN handles the radio communications between the UE 101 and the EPC 105 and just has one component, the evolved base stations, called eNodeB or eNB 102. Each eNB 102 is a base station that controls the UE 101 in one or more coverage cells. Each eNB 102 connects with the EPC 105 by means of a standards-defined S1 interface and it can also be connected to other nearby eNBs by a standards-defined X2 interface, which is mainly used for signaling and packet forwarding during handover.

The UE 101 can be a wireless connected device, such as a mobile phone, a computer, or any remotely controlled machine, including any physical object networked according to a concept commonly referred to as the "Internet of Things" (IOT). The RAN portion 103 can conform, at least in part, to one or more standardized configurations, such as GSM Radio Access Networks (GRAN), GRAN specifying the inclusion of EDGE packet radio services (GERAN), UMTS Radio Access Network (UTRAN), the LTE high-speed and low-latency radio access network, also referred to as Evolved UTRAN (E-UTRAN).

The CN portion 105 generally provides access to one or more external networks, such as the Internet, an IP Multimedia Subsystem (IMS) for delivering IP multimedia services, a public switched telephone network (PSTN). The CN portion 105 is a central part of the mobile communications system 100 that provides various service capabilities to the UE 101 of customers, or subscribers who are in communication with the RAN portion 103. Service capabilities can include, without limitation, voice, Voice over IP (VOIP), text messaging services, such as Short Message Service (SMS), video, streaming media, unicast, point-to-multipoint delivery, such as Multimedia Broadcast Multicast Services (MBMS), simulcast/multicast, and the like.

In the illustrative example, the mobile communications system 100 includes an LTE network portion, e.g., a "4G" portion, and a UTRAN network portion, e.g., a "3G" portion that alone or collectively deliver service capabilities to the UE 101. For example, the UE 101 may receive one or more service capabilities by way of the LTE network portion, relying upon the UTRAN network portions as a fall back. Alternatively or in addition, a capability of the UE 101 determines whether the LTE network portion or the UMTS portion of the network portion deliver the service capabilities. Still other determining factors as to whether the 4G portion or 3G portion of the network deliver services can include a subscribed level of service, a user preference, an established rule, and the like.

In the illustrative example, an LTE portion of the RAN 103 includes an Evolved Node B (eNB) 102, and a Home eNB (HeNB) 106, otherwise known as a femtocell access point. The HeNB 106 is a low-power transmitting device, generally installed indoors (home or office), and connected to the Internet via cable, DSL, on-premise fiber optic link, or some similar IP backhaul technology. The HeNB 106 is in communication with an LTE portion of the CN 105 by way of a HeNB gateway (HeNB-GW) 118. The HeNB-GW 118 can be considered part of a Radio Network Subsystem (RNS). The HeNB 106 and HeNB-GW 118 allow a wireless network protocol, such as WiFi, BlueTooth, or the like, to serve as a virtual extension of LTE.

A UMTS portion of the RAN 103 includes a Node B (NB) 104 and an Access Point (AP) 108. The NB 104 is a logical node responsible for radio transmission/reception in one or more cells to/from the UE 101. The NB 104 is under the control of a Radio Network Controller (RNC) 122, which carries out radio resource management and/or some mobility management functions. The RNC 122 can also serve as a point where encryption/decryption is performed for user data sent over an air link to/from UE 101. The RNC 122 is also responsible for the handover decisions that require signaling to the UE 101. Notably, the eNB 102 does not require an RNC 122. The AP 108 allows the UE 101 to connect to a UMTS portion of the CN 105 by way of an F-GW 124, using a wireless link, e.g., Wi-Fi, BlueTooth and the like, to serve as a virtual extension of UMTS. The F-GW 124 can be considered part of the RNC.

An LTE portion of the CN 105 includes, without limitation, a Mobility Management Entity (MME) 114, a Serving Gateway (S-GW) 112, a Packet Data Network (PDN) Gateway (P-GW) 110 and a Home Subscriber Server (HSS) 116.

Signaling interfaces, sometimes referred to as a control plane, are provided between the eNB 102 and the MME 114, between the HeNB-GW 118 and the MME 114, between the MME 114 and the S-GW 112, and between the MME 114 and the HSS 116. User data exchange interfaces, sometimes referred to as a user plane, are provided between the eNB 102 and the S-GW 112, between the HeNB-GW 118 and the S-GW 112, and between the S-GW 112 and the P-GW 110.

The MME 114 serves as a control node for an LTE access-network, providing nodal functions that include idle mode, UE paging and a tagging procedure including retransmissions. The MME 114 is also involved in a bearer activation/deactivation process and is responsible for choosing an S-GW 112 for a particular UE 101 at an initial attach and at an intra-LTE handover. The MME 114 is also responsible for authenticating the user, e.g., by interacting with the UE 101 and the HSS 116. Non Access Stratum (NAS) signaling terminates at the MME 114 and it is responsible for generation and allocation of temporary identities to the UE 101. The MME 114 also provides control plane functions for mobility between LTE and 2G/3G access networks.

The S-GW 112 routes and forwards user data packets, while also serving as a "mobility anchor" for a user plane during inter-eNB handovers and as a mobility anchor between LTE and other 3GPP technologies. The S-GW 112 relays traffic between 2G/3G systems and the P-GW 110. For idle state UEs 101, the S-GW 112 terminates a downlink data path and triggers paging when downlink data arrives for the UE 101. The S-GW 110 also manages and stores UE contexts, e.g., parameters of an IP bearer service, network internal routing information.

The P-GW 110 provides connectivity from the UE 101 to external packet data networks by serving as a point of exit and entry of traffic for the UE 101. In the illustrative example, the P-GW 110 is combined with a 3G, UMTS GGSN nodal function. A UE 101 may have simultaneous connectivity with more than one P-GW 110 for accessing multiple PDNs. The P-GW 110 can serve as a mobility anchor between 3GPP and non-3GPP technologies. The P-GW 110 can also perform one or more of policy enforcement, packet filtering for each user, charging support, lawful interception and packet screening. Policy, e.g., max bandwidth, QoS, can be obtained from a Policy & Charging Rule Function (PCRF) 136.

The HSS 116 includes a database that can include subscription-related information (subscriber profiles). In some embodiments, the HSS 116 performs authentication and authorization of a user. The HSS 116 can also provide information about the subscriber's location and IP information.

For each UE 101 associated with an LTE portion of the system 100, at a given point of time, there is a single S-GW 112. Functions include packet routing and forwarding, a local mobility anchor point for inter eNB handovers, E-UTRAN idle mode downlink packet buffering and initiation of network triggered service request procedure, E-UTRAN idle mode downlink packet buffering and initiation of network triggered service request procedure, Accounting on user and QoS Class Identifier (QCI) granularity for inter-operator charging, uplink (UL) and downlink (DL) charging per UE 101, PDN, and QCI, etc.

A UMTS portion of the CN 105 includes a Gn General Packet Radio Service (GPRS) Support Node (Gn-SGSN) 120, an S4 GPRS Support Node (S4-SGSN) 126, a Gateway GPRS Support Node (GGSN) 110, a Home Location Register (HLR) 128, a 3GPP Machine Type Communication (MTC)—Interworking Function (MTC-IWF) 132, and a Service Capability Server (SCS) 134.

The Gn SGSN 120 and S4-SGSN 126 provide mobility management to an attached UE 101, based on a current location. The SGSN 120, 126 can also be used to manage data sessions and/or billing. The Gn-SGSN 120 provides a backward compatible interface to the GGSN 110, e.g., using a GTP protocol; whereas, the S4-SGSN 126 provides an evolved packet core interface to the S-GW 112. The HLR 128 includes a database that can include administrative information about each subscriber along with a last known location. The GGSN 110 is a central element within the UMTS packet switched network that handles interworking with external packet switched networks (not shown). The MSC 130 manages circuit-switched calls under way, and the MTC-IWF 132 supports machine type communications in cooperation with the SCS 134. It is understood that machine type communications includes machine-to-machine (M2M) communications. The P-GW 110 has a similar role as a GPRS support node (GGSN), while the S-GW 112 and MME 114 have a similar role as a serving GPRS support node (SGSN) with UMTS and GSM.

In some embodiments, the system 100 includes an Access Network Discovery and Selection Function (ANDSF) 138. The ANDSF 138 can provide information to the UE 101 about connectivity options for 3GPP and non-3GPP access networks (such as Wi-Fi). Namely, the ANDSF 138 can assist the UE 101 with discovering access networks within a vicinity of the UE 101. The ANDSF 138 can also provide rules (policies) to prioritize and manage connections to any such access networks, e.g., to offload traffic from cellular networks.

The aforementioned nodes of the system 100 can be interconnected in various configurations according to applicable standardized interfaces, e.g., as illustrated. Namely, with respect to the LTE portion of the system 100, the eNB 102 communicates with the MME 114 by way of an S1-MME interface and the S-GW 112 by way of the S1-U interface. The HeNB 106 communicates with the HeNB-GW 118 through the S1-MME and S1-U interfaces. The HeNB-GW 118, in turn, communicates with the MME 114 by way of an S1-MME interface and the S-GW 112 by way of the S1-U interface. The MME 114 communicates with the HSS 116 by way of the S6a interface, and the S-GW 112 communicates with the P-GW GSSN 110 by way of the S5/S8 interface. The P-GW GSSN 110, in turn, communicates with the PCRF 136 by way of the Gx interface, and the PCRF 136 communicates with the HSS 116, by way of the Sh interface.

Communications between nodal functions generally conform to prescribed protocols. The protocols correspond to the associated logical interfaces. It is understood that the logical interfaces can be conveyed over direct physical connections between nodes or virtual networks using any suitable transport network.

The interface protocols can be grouped generally into user plane protocols and control plane protocols. User plane protocols are protocols implementing the actual radio access bearer service, i.e., carrying user data through the access stratum. Control plane protocols are protocols for controlling radio access bearers and connections between the UE 101 and the system 100 from different aspects (including requesting the service, controlling different transmission resources, handover & streamlining etc.).

With respect to the other, e.g., UMTS, portions of the system 100, the NB 104 communicates with the RNC 122 by way of an IuB interface. The RNC 122, in turn, communicates with the MSC 130 by way of an IuCS interface, with each of the S4-SGSN 126 and the Gn-SGSN 120 by way of IuPS interfaces. Likewise, the AP 108 communicates with the F-GW 124 by way of an IuH interface. The F-GW 124, in turn, communicates with the MSC 130 by way of an IuCS interface, with each of the S4-SGSN 126 and the Gn-SGSN 120 by way of IuPS interfaces. The HLR 128 communicates with each of the S4-SGSN 126 and the Gn-SGSN 120 by way of Gr interfaces. The S4-SGSN 126 and the Gn-SGSN 120 each communicate with the P-GW GGSN 110 by way of a Gn/Gp interface.

The ANDSF 138 communicates with the UE 101 by way of an S14 interface and with the HSS 116 by way of an Sh interface. The S4-SGSN 126 communicates with the HSS 116 by way of an S6d interface. The MME 114 communicates with the S4-SGSN 126 by way of an S3 interface, and with the Gn-SGSN 120 by way of a Gn interface.

The MTC-IWF 132 communicates with the MSC 130 by way of a T5c interface, with the MME 114 by way of a T5b interface, with the HSS 116 by way of an S6m interface and with the S4-SGSN 126 by way of a T5a interface. The UE 101 communicates with one or more of the eNB 102, the HeNB 106, the NB 104 and the AP 108.

The system 100 provides functions related to mobility of the UE 101. Mobility functions include, without limitation, handover, relocation, paging support, positioning, and system information retrieval. A handover function manages mobility of the radio interface. It can be based on radio measurements and used to maintain a Quality of Service (QoS) requested by the CN 105. A handover event may be directed to/from another system (e.g., UMTS to GSM handover). The handover function may be either controlled by the system 100, or independently by the UE 101.

The paging support function provides a capability to request a UE 101 to contact the UTRAN/GERAN Iu mode when the UE 101 is in a particular state, such as an idle state. The Positioning function provides a capability to determine a geographic position and optionally a velocity of the UE 101. Other Functions related to radio resource management and control include a connection set-up and release function and an allocation and deallocation of a radio bearer function.

Other mobility functions can include inter-cell interference coordination and load balancing functions. The inter-cell interference coordination function manages radio resources, e.g., radio resource blocks, such that the inter-cell interference is kept under control. This function can take into account information on resource usage status and traffic load situations from multiple cells. The load balancing function handles uneven distribution of traffic load over multiple cells to support high utilization of radio resources, while maintaining QoS of in-progress sessions to the greatest extent possible.

In general, each system node, e.g., E-UTRAN nodes, UTRAN nodes, EPC nodes, can be considered a network element on its own. Knowledge or awareness about the equipment of a network element can be kept within the network element itself and its management system, such that the node can manage node-internal resources. As illustrated herein, there are many nodal functions independently defined by 3GPP standards. These nodal functions, together with strict interface boundaries defined therebetween generally promote a multi-vendor environment. This approach has resulted in certain efficiencies, but at the cost of other issues, such as interworking issues and race conditions during call processing. Such issues can be especially challenging when deploying high value services such as Voice over LTE (VoLTE) and IMS video.

Figure 2:
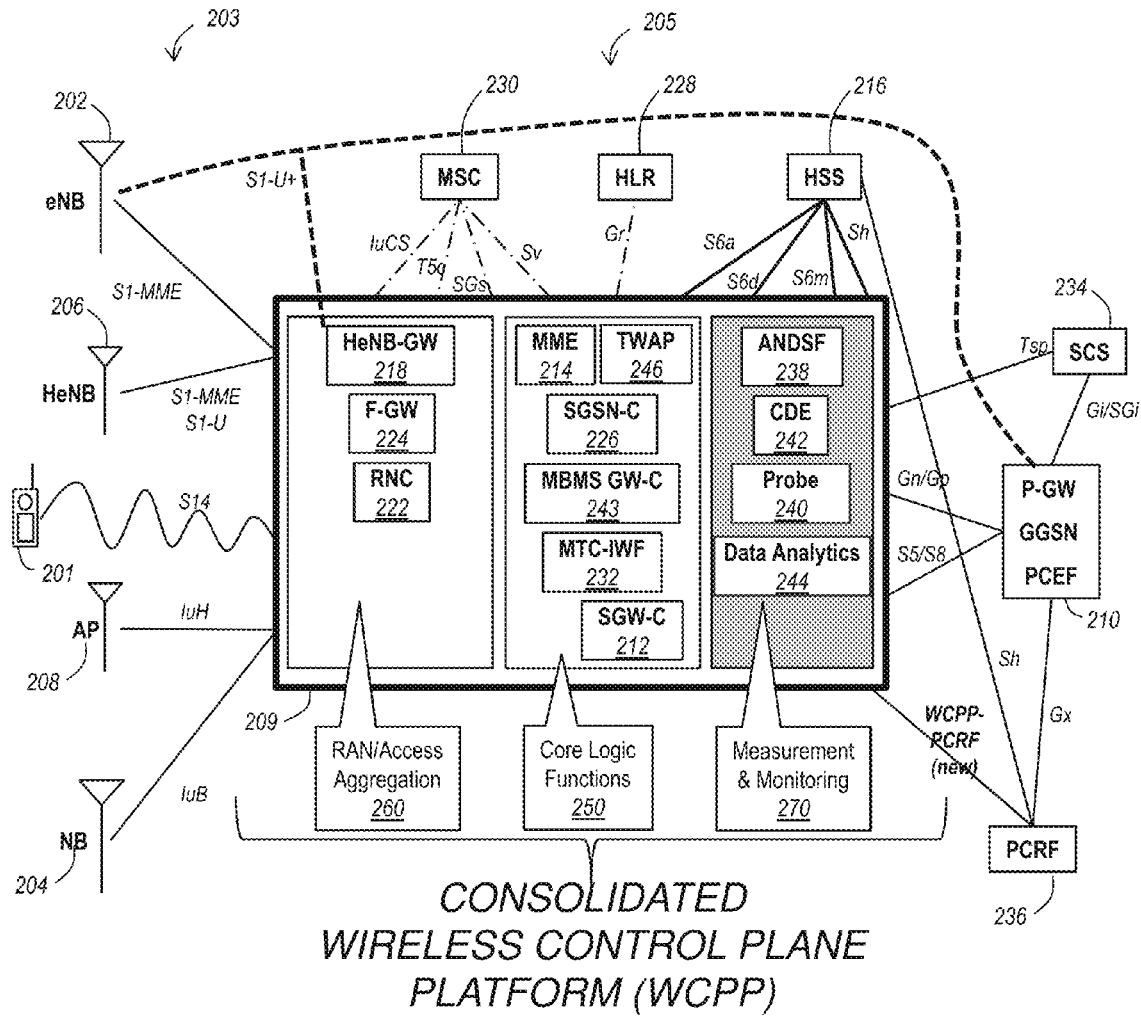
FIG. 2 depicts another illustrative embodiment of a wireless mobility network incorporating a consolidated wireless control plane platform.

FIG. 2 depicts illustrative embodiment of another wireless communications system 200 that incorporates a consolidated Wireless Control Plane Plexus (WCPP) 209. The consolidated WCPP 209 combines, merges, integrates and/or otherwise unites several nodal functions into a reduced number of network elements or platforms. The coordinated nodal functions can include signaling or control functions, otherwise said to be control plane functions or reside in the control plane. It is understood however, that such consolidated functions need not be exclusively in the control plane. That is, other functions can include user plane functions, probe functions, analysis functions, and the like.

In the illustrative example, the consolidated WCPP 209 includes a core logic functions portion 250, a RAN/access aggregation portion 260, and a measurement and monitoring portion 270. The core logic functions portion 250 consolidates one or more nodal functions of the CN 105 (FIG. 1). In the particular embodiment, the core logic functions portion 250 includes MME nodal functions 214, S-GW nodal control functions 212, Trusted Wireless Local Area Network (WLAN) Access Proxy (TWAP) nodal functions 246, SGSN nodal control functions 226, MTC-IWF nodal functions 232 and MBMS gateway nodal control functions (MBMS GW-C) 243.

Likewise, the RAN access aggregation portion 260 consolidates one or more nodal functions of the RAN 103 (FIG. 1). In the illustrative embodiment, the RAN/access aggregation portion 260 includes RNC nodal functions 222, F-GW nodal functions 224 and HeNB-GW nodal functions 218. The consolidated WCPP 209 further includes a measurement and monitoring portion 270. The Measurement and Monitoring composite VM includes probe functions, RAN analytical functions and access network selection functions. The measurement and monitoring portion 270 includes an ANDSF nodal function 238, a CDE nodal function 242, a probe function 240 and a data analytics nodal function 244.

In some configurations, certain nodal functions, or network elements, of the system 200 are not combined or otherwise merged with the consolidated WCPP 209. Consider the base station portions of a RAN 203, i.e., the eNB 202, the HeNB 206, the AP 208 and the NB 204. The consolidated WCPP 209 communicates with the base station portions of the RAN 203 according to standards compliant interfaces or reference points. Thus, the interfaces between the base station portions of the RAN 203, including a UE 201, and the consolidated WCPP 209 are equivalent to the interfaces portrayed in FIG. 1. In this manner, the same standards-compliant base station portions of the RAN 203, and the UE 201, can be used in cooperation with the consolidated WCPP 209, without modification.

Likewise, standards-compliant interfaces or reference points can be maintained with other external nodal functions, such as an MSC 230, an HLR 228, an HSS 216, an SCS 234, a P-GW/GGSN/PCEF 210, whether separate or combined, as shown, and with a PCRF 236. A comparison of the types of interfaces between these external node functions to the consolidated WCPP 209 and interfaces of corresponding external nodal functions of FIG. 1, demonstrated that the same types of interfaces are used. The number of such interfaces, however, may be reduced resulting from consolidation of nodal functions that otherwise required separate interfaces, e.g., a single Gn/Gp interface portrayed between the P-GW/GGSN/PCEF 210 and the consolidated WCPP 209, can represent two similar interfaces to the S4-SGSN 126 and Gn-SGSN 120 (FIG. 1).

In at least some embodiments, it may be indistinguishable to the non-consolidated elements or nodal functions of the system 200, whether they are interacting with a consolidated WCPP 209, or non-consolidated nodal functions, e.g., as in the non-consolidated system 100 (FIG. 1). Beneficially, however there is no such need to maintain standard interfaces between consolidated network elements or nodal functions. It is understood, however, that in at least some embodiments, one or more standard interfaces can be maintained internally, between some or all of the consolidated nodal functions. Maintaining such standard interfaces can provide some degree of flexibility, e.g., should a consolidated nodal function, such as the MBMS GW-C 243, or the TWAP 246, be "unconsolidated," e.g., during a system configuration in which a configuration of the consolidated WCPP 209 is adjusted. Maintaining internal standard interfaces between consolidated nodal functions can also allow consolidated nodal functions to be exchanged or otherwise reconfigured at the nodal function level, and across vendors. That said, certain advantages can be realized by eliminating or otherwise collapsing one or more standard interfaces between consolidated nodal functions.

In some embodiments, some or all of the standard interfaces or reference points between more than one nodal functions of the consolidated WCPP 209 can be collapsed. Collapsing of such local interfaces can include elimination of the standard interface altogether. In some embodiments, the standard interfaces are replaced with an alternative interface on a one-for-one basis. The standard interfaces can be replaced with another standard interface, including non 3GPP interfaces, with a proprietary interface, or with some combination of standard and proprietary interfaces.

It is conceivable that a single interface, e.g., a single standard interface or a single proprietary interface, can be used to replace multiple 3GPP standard interfaces, including multiple different standard interfaces. Consider a single proprietary interface replacing both of the S11 interface and S1-MME interfaces. Thus, the same interface can support communications from a consolidated MME nodal function 214 and the consolidated HeNB-GW nodal function 218, e.g., in place of the S1-MME interface, and between the MME nodal function 214 and the consolidated S-GW-C nodal function 212, in place of the S11 interface.

Collapsing of an interface can also include any degree of modification of a standard interface or reference point. Consider a collapsed interface between consolidated nodal functions in which messages exchanged are similar or the same as message exchanged on the standard interface. For example, the same messages can be exchanged according to a different protocol stack. It is understood that in at least some embodiments, such inter-nodal messages can be entirely different than any standard messages. In at least some embodiments, some standardized messages associated with a standardized interface can be eliminated altogether as a result of the nodal function consolidation.

It is understood that in at least some embodiments, collapsing of an interface includes removal of the interface altogether. Interfaces generally support an exchange of information, e.g., according to a particular protocol. Having different nodal functions combined within the same consolidated WCPP 209, provides opportunities for transferring information from one nodal function to another without using an interface between the two nodal functions. Consider a configuration in which one nodal function writes information to a particular memory location, database etc. The other nodal function can simply read the information from or otherwise access the memory location, database and the like.

In some embodiments, one or more nodal functions of the consolidated WCPP 209 can exchange information beyond any exchanges disclosed in applicable 3GPP standards. For example, contextual information associated with the UE 201 may be obtained or otherwise updated by one of the consolidated nodal functions, such as the RNC 222, the F-GW 224 or the MME 214. The contextual information can be shared or otherwise provided to other consolidated nodal functions, such as the S-GW-C 212 or the MBMS GW-C 226. Exchange of information, such as context of the UE 201, can facilitate mobility within the system 200 as the various nodal functions are aware of the actual context, which may have changed or been otherwise updated since a prior contact. Such immediacy and consistency offered by context sharing can alleviate or otherwise avoid inconsistencies and/or delays that may result from race conditions, signal delay and the like.

A UE context can include a block of information stored in a base station, e.g., an eNB 102, that is associated with an active UE 101. The block of information can contain necessary information required to maintain delivery of mobile services towards the active UE 101. Without limitation, the UE context can include UE state information, security information, UE capability information and the identities of the UE-associated logical S1-connections. A UE context can be established when a transition to active state for a UE 101 is completed or in target base station, e.g., eNB 102, after completion of handover resource allocation during handover preparation.

The UE 101 is generally in one of several states. The states can be associated with different layers, e.g., a Non-Access Stratum (NAS) layer and a Radio Resource Control (RRC) layer. By way of example, the RRC layer, the states include: "idle" or "connected." In the idle state, the UE 101 is known in CN portion 105 and has an IP address, but not known in the RAN portion 103. In the connected state, the UE 101 is known in both the CN portion 105 and the RAN portion 103, with a location known to at least a cell level. Establishment of a connection transitions a UE 101 from the idle state to the connected state. Likewise, release of a connection transitions the UE 101 from the connected state to the idle state.

In the NAS layer, the UE 101 can be in one of several other states, including EPS Mobility Management (EMM) states, EPS Session Management (ESM) states and EPS Connection Management (ECM) states. The EMM states describe the mobility management states that result from the mobility management procedures e.g. "Attach" and "Tracking Area Update (TAU)" procedures, and include "EMM-Registered" and "EMM-Deregistered." In the EMM-Registered state, the UE 101 has been attached to the system 100, an IP address has been assigned to the UE 101, a bearer has been established, and the MME 114 knows a current location of the UE 101. In the EMM-Deregistered state, the UE 101 is not attached to any system 100, the MME 114 does not know a current location of the UE 101, but may have tracking area information last reported by the UE 101.

The ESM states include "Bearer Context Active" and "Bearer Context Inactive." The ECM states include "ECM-Connected" and "ECM-Idle." In the ECM-Connected state, a NAS signaling connection has been established and the UE 101 has been assigned physical and network resources. In the ECM-Idle state, no NAS signaling connection has been established, and the UE 101 has not been assigned any physical resources, e.g., radio resources (radio bearer(s)) or any network resources, e.g., S1 bearer/S1 signaling connection.

In the Idle state, the UE 201 "camps" on a cell after a cell selection or reselection process where factors like radio link quality, cell status and radio access technology are considered. The UE 201 also monitors a paging channel to detect incoming calls and acquire system information. In this mode, control plane protocols of the consolidated WCPP 209 include cell selection and reselection procedures. In the connected state, the UE 201 supplies the RAN 203, e.g., the E-UTRAN, with downlink channel quality and neighbor cell information to enable the E-UTRAN 203 to select the most suitable cell for the UE 201. In this case, control plane protocol includes the Radio Link Control (RLC) protocol.

According to the techniques disclosed herein, the consolidated WCPP 209 simplifies one or more of mobility control plane functions, mobility call flows and unifies the UE state contexts to revolutionize call control functions within the mobility network. Some illustrative examples are provided herein below. The consolidated WCPP 209 also breaks organizational boundaries, promotes cooperation among wireless network architects and makes each architect to think end-to-end instead of focusing on his/her own silos due to the current 3GPP network standards.

Although particular nodal functions are depicted as being grouped in a particular manner within the consolidated WCPP 209, this should be considered in no way limiting. That is to say, the consolidated WCPP 209 can include only a RAN/access aggregation portion 260, without consolidation of the core logic functions portion 250 or the measurement and monitoring portion 270. Similarly, the consolidated WCPP 209 can include only the core logic functions portion 250 without the other portions 260, 270. Other embodiment can include combinations of two or more of the aforementioned consolidated portions 260, 250, 270 taken in combination.

The nodal functions associated with signaling or control can be referred to as control plane nodes; whereas, those nodal functions associated with user data can be referred to as user plane nodes. Control plane protocols and user plane protocols are supported by the various interfaces. An example S1-U+ user plane connection is illustrated in FIG. 2. The S1-U+ user plane connection extends between the eNB 202 and the P-GW/GGSN/PCEF 210, and between the HeNB-GW nodal function 218 of the consolidated WCPP 209 and the P-GW/GGSN/PCEF 210. User data packets can be exchanged between the connected nodes, e.g., by way of the S1-U+ user-plane connection as established or otherwise coordinated by the consolidated WCPP 209 and other parts of the system 200.

One or more of the nodal functions of the system 100 and/or the portions 260, 250, 270 of the consolidated WCPP 209 can be implemented on a physical machine or platform, e.g., a server or a gateway network element, processor or computer. In at least some instances, different physical platforms are used for each of the various nodal functions. These can include different devices, e.g., from different vendors, at a common location, devices at multiple dispersed locations, and combinations thereof. The consolidated WCPP 209 reduces network operation overheads by virtualization of multiple physical network functions/nodes into a single composite module, e.g., a single Network Function Virtualization (NFV) module. The techniques disclosed herein can be implemented in or otherwise support a Software Defined Network (SDN) capability. In order to address the nodal interworking issues and call processing coordination issues, NFV concepts can be applied to various parts of the system 100, 200, such as in the Mobility Control Plane.

By way of example, one or more virtual machines can be configured to implement the nodal functions of either system 100, 200. Consider a first virtual machine implementing the RAN/access aggregation portion 260, a second virtual machine implementing the core logic functions portion 250, and a third virtual machine implementing the measurement & monitoring portion 270. The different virtual machines can be provisioned, configured and otherwise maintained by the same or different entities. Partitioning of the virtual machines, e.g., as indicated can be beneficial according to any different entities. Alternatively or in addition, a single virtual machine can implement two or more of the RAN/access aggregation portion 260, the core logic functions portion 250 and the measurement & monitoring portion 270.

In some embodiments, different virtual machines can be provided or otherwise configured according to the applicable 3GPP standard, or technology. Consider a first virtual machine consolidating the LTE nodal functions of the consolidated core logic functions 250 and a second virtual machine consolidating the UMTS nodal functions of the consolidated core logic functions 250. It is conceivable that the consolidated WCPP 209 can be implemented with different virtual machines for the consolidated LTE portions and the consolidated UMTS portions. Namely, one virtual machine can include LTE portions of each of the consolidated WCPP portions 260, 250, 270; whereas, another virtual machine can include UMTS portions of each of the consolidated WCPP portions 260, 250, 270.

It is understood that the systems 100, 200 can include more than one of some or all of the various nodal functions and associated interfaces. For example, each consolidated WCPP 209 of a group of consolidated WCPPs 209 can be assigned to a respective pool area. The UE 201 can move within a pool area without a change of serving consolidated MME nodal function 214. Every consolidated WCPP pool area is controlled by one or more consolidated WCPPs 209 on the network. Likewise, an S-GW service area can be served by one or more consolidated S-GW nodal functions 212, through which the UE 201 can move without a change of serving gateway.

The consolidated WCPP pool areas and the S-GW service areas can both be made from smaller, non-overlapping units known as tracking areas (TAs). They are similar to the location and routing areas from UMTS and GSM and are used to track the locations of mobiles that are on standby mode. Pooling is disclosed in U.S. patent application Ser. No. 14/679,395, filed on Apr. 6, 2015, entitled "Proximity Based Sub-Pooling of Network Devices in Mobile Wireless Networks" and incorporated herein by reference in its entirety. Beneficially, the consolidated WCPP 209 extends geo-diverse MME pooling functions to all the composite VMs it supports, i.e., RAN access aggression, EPC core control plane and measurements & monitoring.

The consolidated WCPP 209 consolidates all wireless mobility signaling closer to equipment of mobility users to provide an efficient mobility management architecture. Efficiency results in part to the equipment of the mobility users being the source of mobility signaling and the beneficiaries of efficient control. To this end, it can be said that the consolidated WCPP 209 internalizes multiple 3GPP standard logical interfaces with a balanced network architecture evolution approach to strike a balance between a totally centralized architecture and a totally distributed architecture. The consolidated WCPP 209 generally reduces mobility signaling latency, end-to-end, and improves mobility procedure processing efficiency since all mobility management processing and Radio Access Bearer management are internalized/self-contained in the same consolidated WCPP 209, e.g., the same composite virtual network function.

The consolidated WCPP 209 generally simplifies a network operator's management of equipment and processes due to a reduced number of platforms and/or a reduced number of external logical interfaces. Also, the elimination of multi-vendor combinations tends to simplify the network operator's role, e.g., allowing the same consolidated WCPP 209 to be provided by a single mobility vendor in a region and/or market. Moreover, the consolidated WCPP 209 imposes end-to-end accountability on a single vendor for its hardware and/or software modules. Still further, the consolidated WCPP 209 significantly simplifies DNS provisioning, i.e., no S-GW selections based on the DNS records are needed and mobility-related DNS queries are generally minimized, unless the mobility event is an inter-WCPP pool scenario. Cycle time for vendor lab testing and time to market of new functionality is also simplified or otherwise improved by the consolidated WCPP 209 approach.

The consolidated WCPP 209 allows smooth migration and decommissioning of 3G hardware platforms with minimum cost and no service impacts. Namely, a consolidated WCPP 209 serving a particular region or market can provide both 3G and 4G capabilities. Since the consolidated WCPP 209 supports 3G service, any legacy 3G network elements in the same region/market can be decommissioned or otherwise removed without impacting service. The 3G service supported by the consolidated WCPP 209 supplants the legacy infrastructure, at least to the extent the infrastructure is provided.

Moreover, the consolidated WCPP 209 provides the opportunity to reclaim power, floor space, HVAC, and transport connections formerly occupied or otherwise supported by legacy 3G network elements and/or multiple, discrete platforms supporting LTE/4G core network functions. Network virtualization, e.g., in the consolidated WCPP 209 allows for the use of virtual machine(s). The virtual machines can include an emulation of a computer system. The emulated computer system can include software, such as operating software, application software, and the like, to emulate any of the network elements and/or nodal functions disclosed herein. The virtual machines can include various configurations that can include dedicated hardware, shared hardware, specialized hardware, networked hardware, and the like.

The consolidated WCPP 209 promotes software module development and version alignment across its consolidated 3GPP nodal functions. The version alignment process, and more generally maintenance, can be facilitated by having a consolidated WCPP 209 serving a region/market. Once again, the consolidated WCPP 209 composite nodal functions can include Virtualized Network Functions (VNF), e.g., provided or otherwise supported by a single mobility vendor in the associated region/market. The consolidated WCPP 209 generally requires less overall maintenance windows, as a software upgrade processes across multiple 3GPP nodal functions is unified by the consolidated nodal functions.

In some embodiments, the consolidated WCPP 209 provides a Local IP Access (LIPA) service architecture to offload local mobility user IP traffic through local Internet gateways or Internet peering points within the markets. The consolidated WCPP 209 also provides a consolidated lawful intercept (LI)/Communications Assistance for Law Enforcement Act (CALEA) control plane surveillance point in markets/regions. Other benefits of the consolidated WCPP 209 include a consolidated mobility Charging Data Record (CDR) and session CDR collection point by market/region.

The consolidated WCPP 209 also provides an opportunity to consolidate various Element Management System (EMS) platforms and nodal support systems. It is understood that such consolidation can support virtualization of EMS software modules.

The consolidated WCPP 209 provides the opportunity to optimize wireless bearer policy management and wireless access policy management through the direct PCRF interaction. As illustrated in FIG. 1, the PCRF 136 supports two interfaces, one to the HSS 116 and another to the P-GW/GGSN 110. In some embodiments, the P-GW/GGSN 110 includes a Policy & Charging Enforcement Function (PCEF), as shown in the P-GW/GGSN/PCEF 210. As illustrated in FIG. 2, the PCRF 236 can support another interface to the consolidated WCPP 209. This interface can be referred to as the WCPP-PCRF interface. The interface allows the PCRF 236 to interact directly with the consolidated WCPP 209, thereby providing an efficient means to implement and/or modify policy management. In some embodiments, the WCPP-PCRF interface is equivalent to an MME/SGSN-PCRF interface, examples of which are disclosed in U.S. patent application Ser. No. 14/064,526, entitled "Method and Apparatus for Managing Communication Interfaces in a Communication System" and incorporated herein by reference in its entirety.

It is also understood that the consolidated WCPP 209 can further optimize mobility network operation by supporting user plane packet routing that simplifies a Deep Packet Inspection (DPI) function, e.g., by using an enhanced 3G Direct Tunnel (e3GDT) feature as well as 4G Direct Tunnel (4GDT) feature, as disclosed in U.S. patent application Ser. No. 14/512,840, filed on Oct. 13, 2014, entitled "System and Methods for Managing a User Data Path," and incorporated herein by reference in its entirety. The enhanced tunneling techniques, e.g., e3GDT or 4GDT, optimize control signaling procedures, DPI or both to reduce processing burden on the WCPP 205 and/or P-GW/GGSN/PCEF 210 nodes. In at least some embodiments, the direct tunneling techniques disclosed herein can utilize the GTP protocol.

A direct tunnel can be established between a base station, e.g., the eNB 202, and the P-GW/GGSN/PCEF 210, without subjecting packet transfers to processing related to the S-GW-C nodal function 212 of the WCPP 205. Accordingly, the direct tunnel includes a first tunnel endpoint corresponding to an S1-U address of the eNB 202, and a second tunnel endpoint corresponding to the S5-U address of the P-GW/GGSN/PCEF 210. Packet data received at either end can be encapsulated into a payload and directed to the corresponding address of the other end of the tunnel. Such direct tunneling, e.g., by way of an S1-U+ interface, avoids processing by the S-GW-C nodal function 212 that would otherwise relay packets between the same two endpoints, e.g., according to a protocol, such as the GTP-U protocol. In some scenarios, a direct tunneling solution can forward user plane data packets between the eNB 202 and the P-GW/GGSN/PCEF 210, by way of the S-GW-C nodal function 212. That is, the S-GW-C nodal function 212 can serve a relay function, by relaying packets between the two tunnel endpoints.

Figure 3:
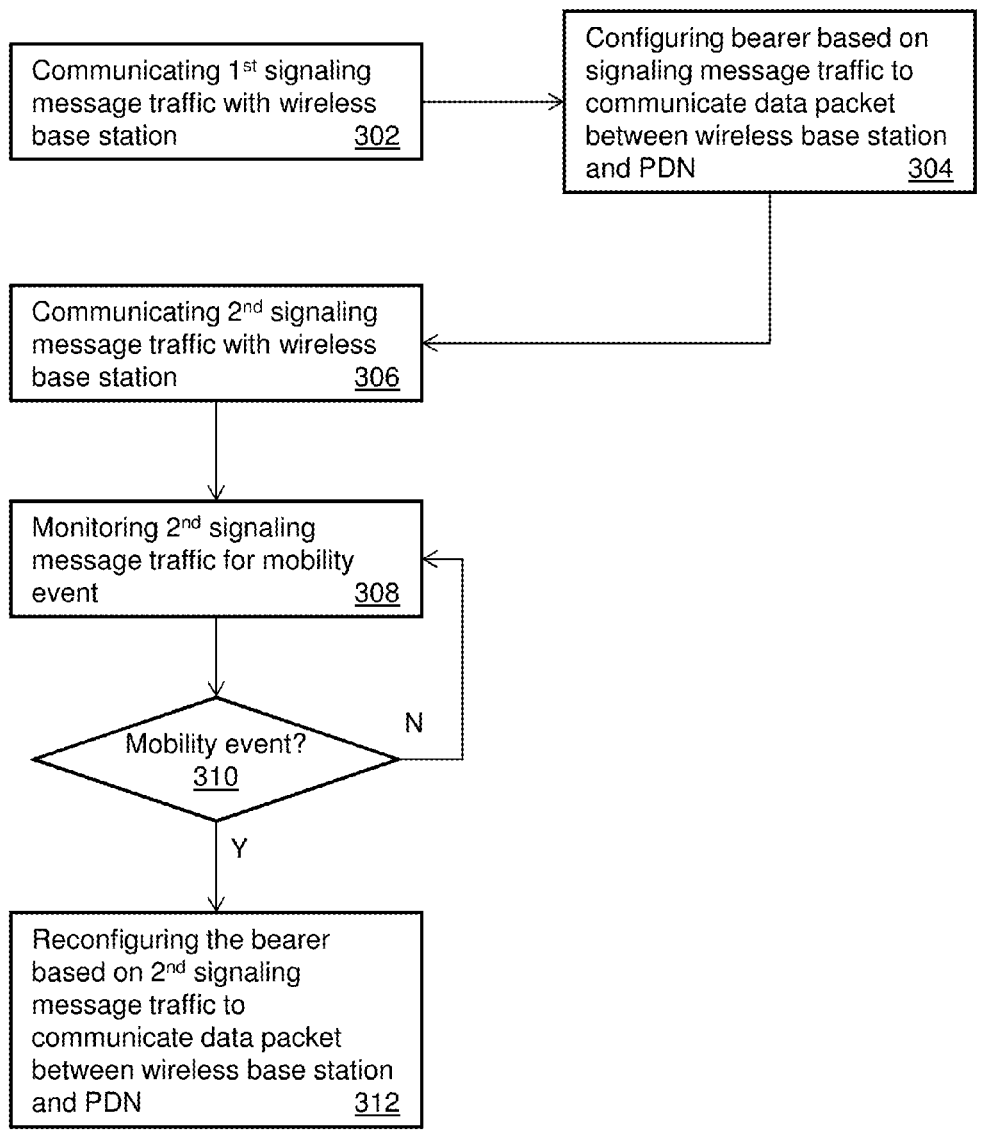
FIG. 3 depicts an illustrative embodiment of a method used in portions of the system described in FIGS. 2 and 4A-10B.

FIG. 3 depicts an illustrative embodiment of an example process 300 used in portions of the system described in FIG. 2 and supporting the example call flows of FIGS. 4A-10B. First signaling message traffic is communicated with a wireless base station at 302. The signaling message traffic can include control plane messages that comply with aspects of standardized nodal functions. For example, the signaling message traffic can include messages communicated over an S1-MME interface between the consolidated WCPP 209 and a UE 201 by way of a base station 202 (FIG. 2). Signaling message traffic can include messages communicated over other control plane or signaling interfaces with other nodal functions, such as the MSC 230, the HLR 228, the HSS 216, the SCS 234, the PCRF 236 and the P-GW/GGSN/PCEF 210. The form and substances of particular messages can be defined by applicable standards and relate to functionality supported by the system 100, 200.

In some instances, the messages contain or otherwise suggest contextual information related to the UE 201 and/or a user account associated with the UE 201. Contextual information can include, without limitation, a state of the UE, e.g., idle, active. Alternatively or in addition, contextual information can include security information, UE capability information and the identities of the UE-associated logical S1-connections. In some instances, the first signaling message traffic is related to a service request.

A bearer is configured based on the signaling message traffic to communicate data packets between the wireless base station and an external packet data network at 304. For example, when the first signaling message traffic relates to an attach request, a default bearer is established. When the first signaling message traffic relates to service requests, other bearers are established, e.g., having associated requirements, such as a QoS, a bandwidth, a latency tolerance, etc., and perhaps other features depending upon the particular requested service. A service, such as a streaming media service, or VoIP might require a greater QoS and/or bandwidth, and a stricter latency tolerance than other services, such as SMS. In at least some instances, the bearer is associated with a tunneling protocol, e.g., to facilitate an exchange of user data being handled by the system 100, 200.

Second signaling message traffic is communicated with the wireless base station at 306. In at least some instances, the second signaling message traffic is associated with the same UE as the first signaling message traffic. Examples include a request for additional services and/or handover requests as may be required.

The second signaling message traffic is monitored for mobility events at 308. Handover requests can be characterized as being related to mobility in that they require a reconfiguration of bearer traffic. For example, a mobile UE 201 might leave a cell of a serving eNB 202 and enter a neighboring cell of a target eNB.

To the extent a mobility event is detected at 310, the bearer is reconfigured based on the second signaling message traffic. Continuing with the example of a UE 201 moving between cells of different eNBs, a path switch request can be generated by the target eNB and forwarded to the consolidated WCPP 209. The WCPP 209 can process the request, determining that the message related to a mobility event, directing packets through the target eNB. In at least some instances, there will be no need to determine whether an S-GW relocation is necessary, as the S-GW nodal functions are implanted within the consolidated WCPP 209.

Figure 4A:
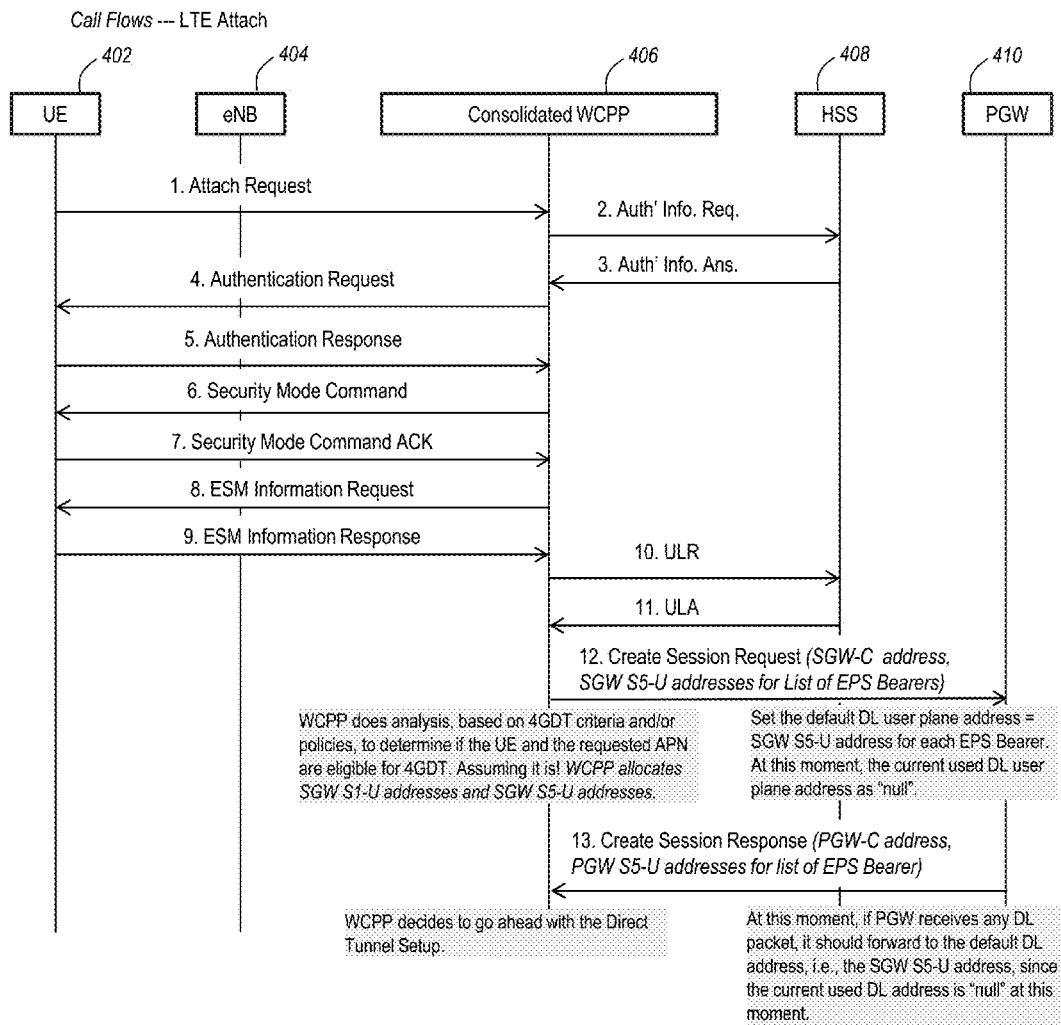
FIGS. 4A & 4B depicts an illustrative embodiment of a LTE attach call flow.
Figure 4B:
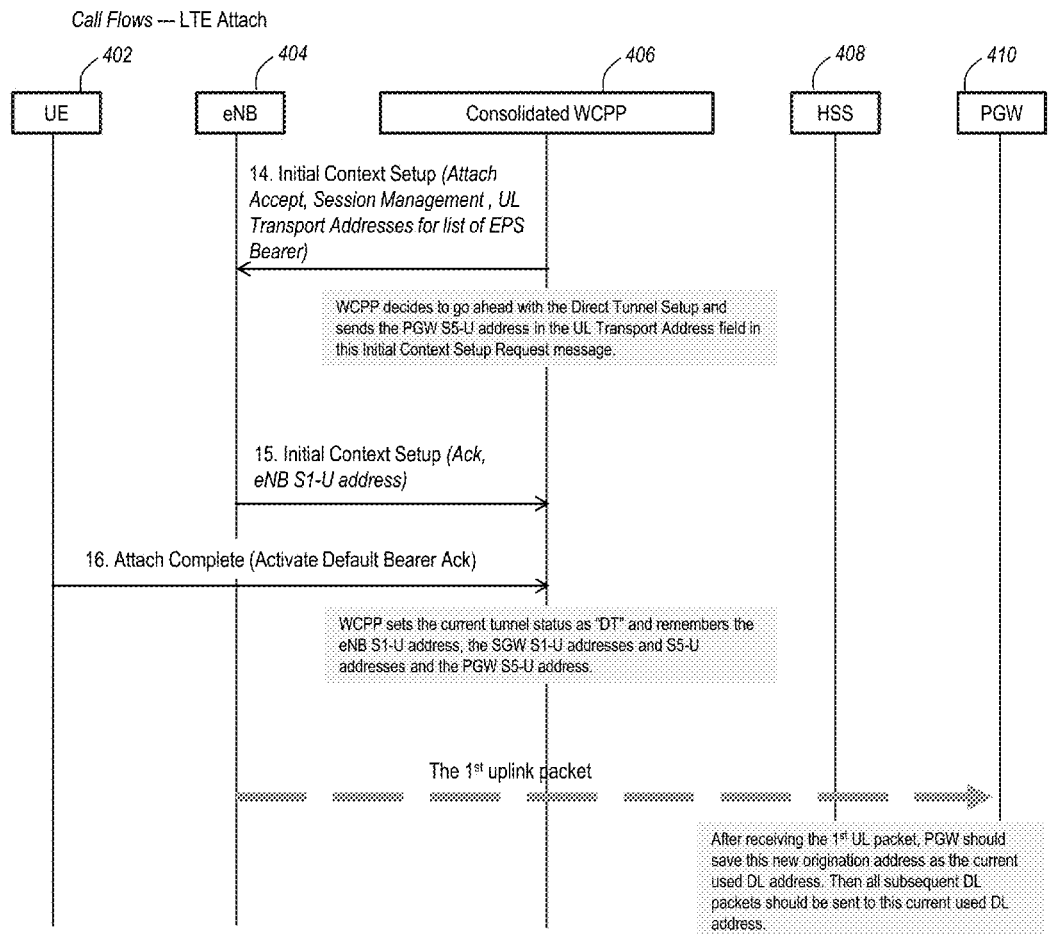

FIGS. 4A & 4B depicts an illustrative embodiment of a LTE attach call flow 400. Messages are exchanged between one or more of a UE 402, an eNB 404, a consolidated WCPP 406, an HSS 408 and a P-GW 410. In summary, the WCPP based call flow 400 saves two signaling messages overall per Procedure, which is about 2/18=~11% saving in the network between MME, S-GW and P-GW. However, it is a relative saving of 50% from the GW point of view. The MME 214 and S-GW 212 logics are combined in the consolidated WCPP 209 (FIG. 2). There is no S-GW selection based on an external DNS information, which saves a substantial, e.g., half, of DNS transactions with DNS servers (not shown). In addition, the DNS Name Authority Pointer (NAPTR) record size for Tracking Area Identity (TAI) Fully Qualified Domain Name (FQDN) and S-GW canonical name are reduced significantly (estimated to be more than 70%). The mobility contexts and the session contexts are shared within the consolidated WCPP 209 among other call processing components. The consolidated WCPP 209 manages the access bearer establishments and virtual S-GW 212 resource allocation. The consolidated WCPP 209 handles the S1-U interface towards the eNBs 404 and the S5-U interface towards the P-GW 410. The consolidated WCPP 209 manages a mobility anchor point for both the signaling plane, e.g., control plane, and the user plane in one place. In other words, all S1 functions can be terminated in a single node.

Figure 5:
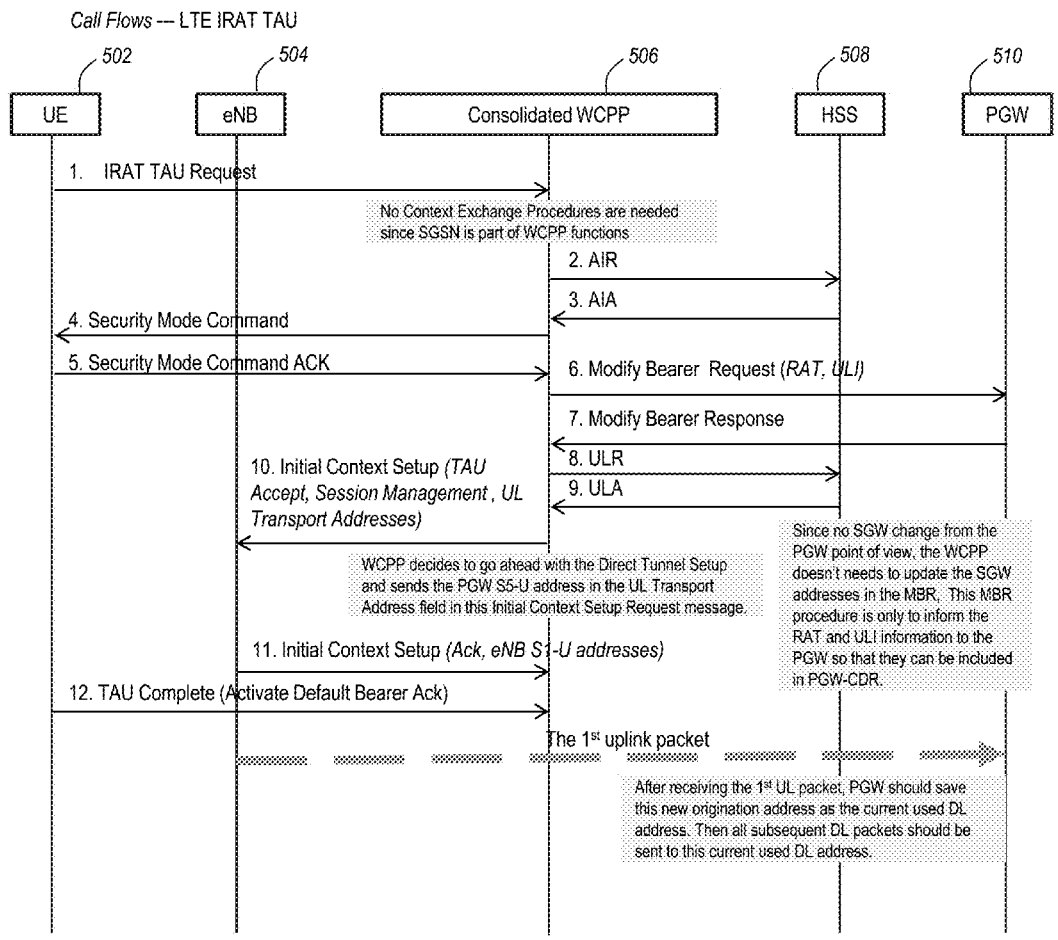
FIG. 5 depicts an illustrative embodiment of an LTE Inter-Radio Access Technology (IRAT) Tracking Area Update (TAU) call flow.

FIG. 5 depicts an illustrative embodiment of an example call flow associated with an LTE Inter-Radio Access Technology (IRAT) Tracking Area Update (TAU) process 500. Messages are exchanged between one or more of a UE 502, an eNB 504, a consolidated WCPP 506, an HSS 508 and a P-GW 510. In summary, the consolidated WCPP based call flow 500 saves approximately seven signaling messages overall per procedure, which is about 7/19=~37% saving in the network between MME 214, the S-GW 212 and the P-GW 410. However, it is a relative saving of 50% from a perspective of the P-GW 410.

The MME 214 and SGSN 226 logics are combined in the consolidated WCPP 209, such that no exchange of Context information, e.g., UE context, is required. The consolidated WCPP 209 might receive indications of UE context from other entities, such as the eNB 202, the HLR 228 or the HSS 216. Alternatively or in addition, the consolidated WCPP 209 might determine or otherwise track and maintain a current context, or at least a best estimate of a current context. Such context tracking can include state machines, e.g., tracking a state of the UE. Once established, the context information can be stored centrally, e.g., within a memory of the consolidated WCPP 209. Alternatively or in addition, the context information can be stored remotely, e.g., in a networked storage, database, or other data repository.

In addition, since the consolidated WCPP 209 as a single node monitors the UE 502 mobility and session activity, it has the continuous knowledge of the UE 502 security states and authentications due to IRAT are not required in order for the consolidated WCPP 209 to re-establish the native LTE Security Context when the UE 502 comes back to the LTE network 200 (FIG. 2). The MME 214 and S-GW 212 logics are combined in the consolidated WCPP 209.

Figure 6:
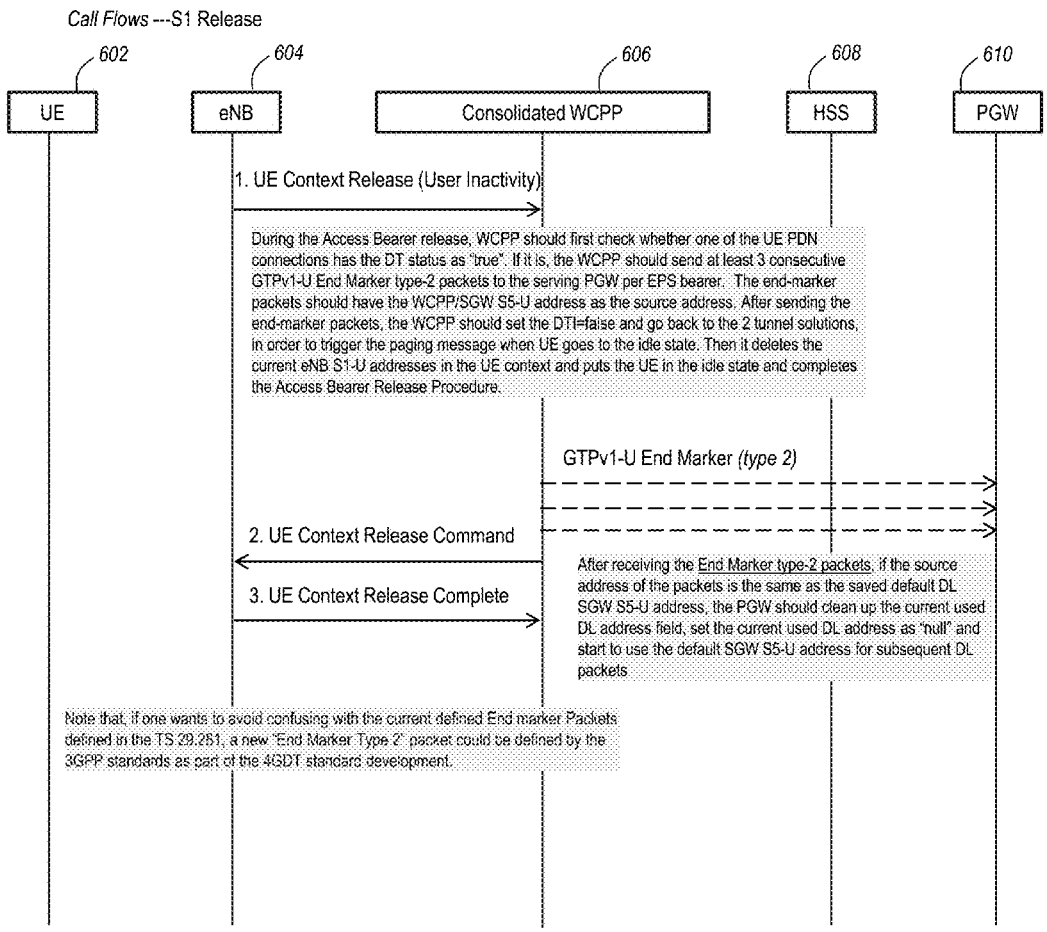
FIG. 6 depicts an illustrative embodiment of an S1 release call flow.

Once again, there is no S-GW selection based on the external DNS information which saves about half of DNS transactions with the DNS servers. In addition, the DNS NAPTR record size for TAI FQDN and S-GW Canonical Name are reduced significantly (estimated to be more than 70%). The mobility contexts and the session contexts are shared within the consolidated WCPP 209 among call processing components. The consolidated WCPP 209 manages the access bearer establishments and virtual S-GW resource allocation. The consolidated WCPP 209 handles the S1-U interface towards the eNBs 502 and the S5-U interface towards the P-GW 510. The consolidated WCPP 209 manages a mobility anchor point for both the signaling plane and the user plane in one place. In other words, all S1 functions are terminated in a single node FIG. 6 depicts an illustrative embodiment of an example call flow associated with an S1 release process 600. Messages are exchanged between one or more of a UE 602, an eNB 604, a consolidated WCPP 606, an HSS 608 and a P-GW 610. In summary, the WCPP based call flow 600 saves two signaling messages overall per Procedure, which is about 2/5=~40% saving in the network between MME, S-GW and P-GW. However, it is a relative saving of 100% from the GW point of view on the control plane. The mobility contexts and the session contexts are shared within the consolidated WCPP 209, among call processing components. The consolidated WCPP 209 manages the access bearer establishments and virtual S-GW resource allocation The WCPP handles the S1-U interface towards the eNBs and the S5-U interface towards the P-GW 610. The consolidated WCPP 209 manages a mobility anchor point for both the signaling plane and the user plane in one place. In other words, all S1 functions are terminated in a single node.

Figure 7:
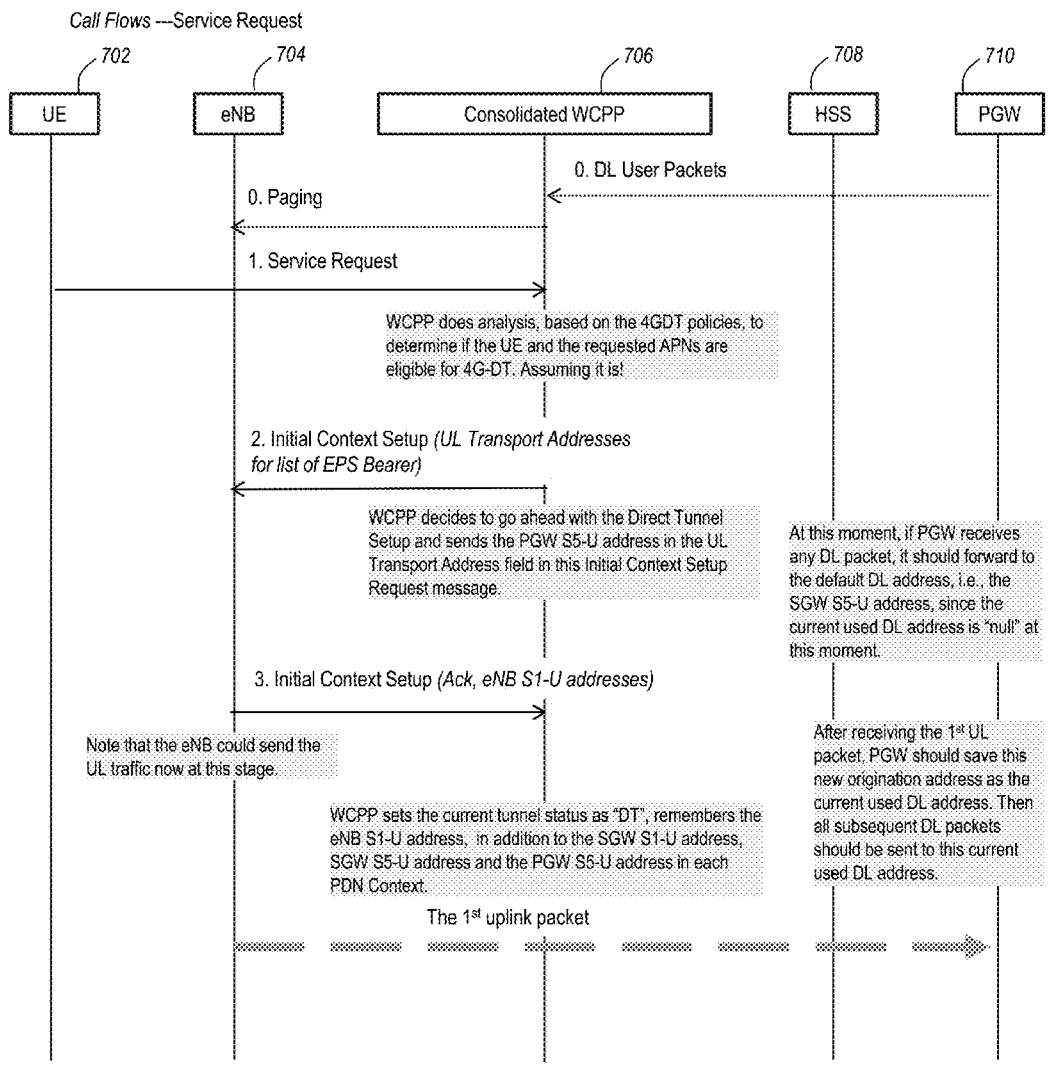
FIG. 7 depicts an illustrative embodiment of a service request call flow.

FIG. 7 depicts an illustrative embodiment of an example call flow associated with a service request process 700. Messages are exchanged between one or more of a UE 702, an eNB 704, a consolidated WCPP 706, an HSS 708 and a P-GW 710. In summary, The WCPP based call flow saves two signaling messages overall per procedure, which is about 2/5=~40% saving in the network between the MME 214, the S-GW 210 and the P-GW 710. However, it is a relative saving of 100% from the P-GW 710 point of view on the control plane. The mobility contexts and the session contexts are shared within the WCPP among call processing components. The consolidated WCPP 209 manages the access bearer establishments and virtual S-GW resource allocation. The consolidated WCPP 209 handles the S1-U interface towards the eNBs and the S5-U interface towards the P-GW 710. The consolidated WCPP 209 manages a mobility anchor point for both the signaling plane and the user plane in one place. In other words, all S1 functions are terminated in a single node.

Figure 8:
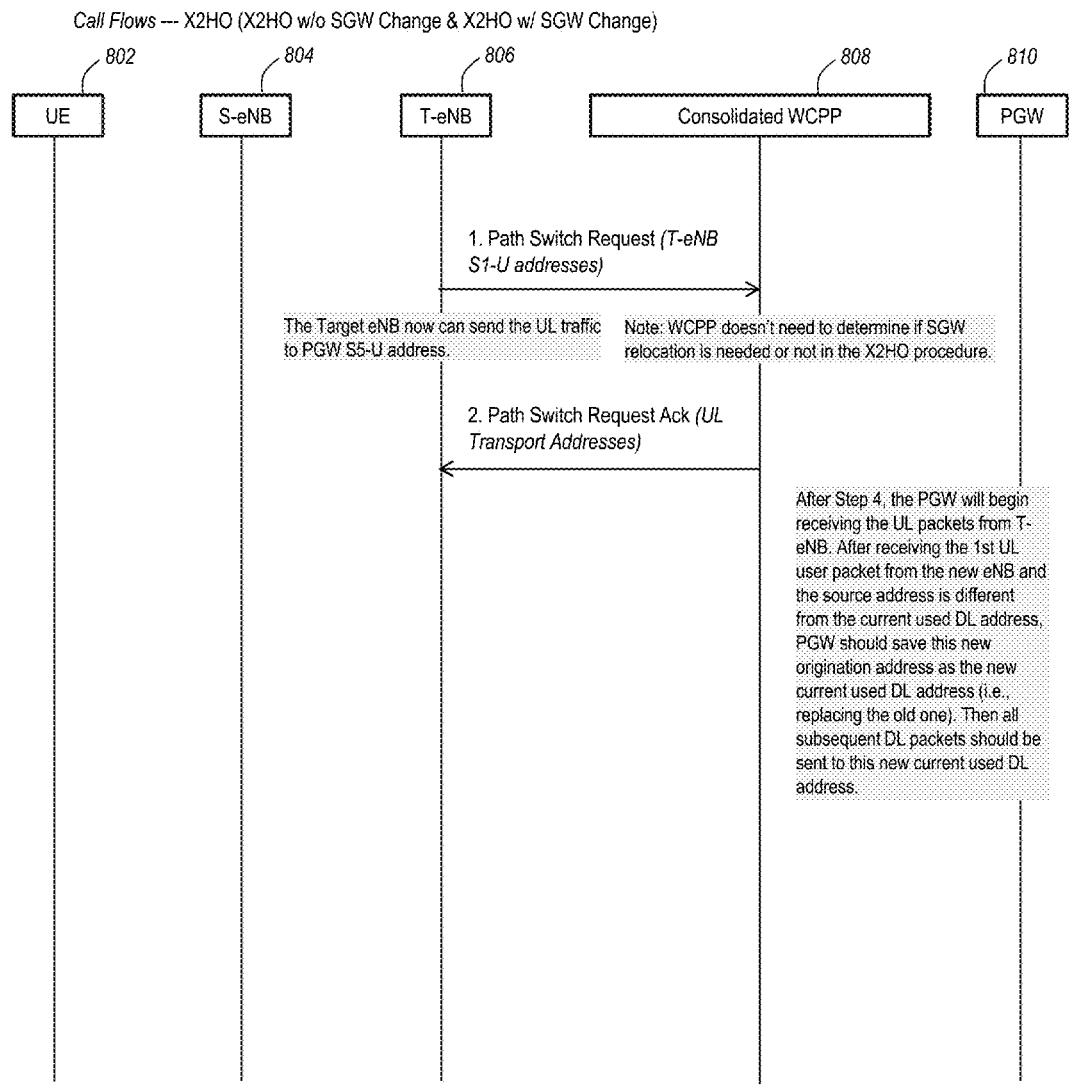
FIG. 8 depicts an illustrative embodiment of an X2 handover call flow.

FIG. 8 depicts an illustrative embodiment of an example call flow associated with an X2 handover process 800. Messages are exchanged between one or more of a UE 802, a serving eNB (S-eNB) 804, a target eNB (T-eNB) 806, a consolidated WCPP 808, and a P-GW 810. A single message exchange 800 is sufficient; whereas, a legacy X2 handover would require two separate versions, depending upon whether the X2 handover requires a S-GW change or not.

When compared to a traditional X2 handover process without S-GW relocation, the WCPP based call flow saves two signaling messages overall per procedure, which is about 2/4=~50% saving in the network between the MME 214, the S-GW 212 and the P-GW 210. However, it is a relative saving of 100% from the P-GW 210 point of view. The MME and S-GW logics are combined in the WCPP. There is no S-GW selection based on the external DNS information which saves 100% of DNS transactions with the DNS servers. In addition, the DNS NAPTR record size for TAI FQDN and S-GW Canonical Name should be reduced significantly (estimated more than 70%). The mobility contexts and the session contexts are shared within the WCPP among call processing components. The consolidated WCPP 209 manages the access bearer establishments and virtual S-GW resource allocation. The consolidated WCPP 209 handles the S1-U interface towards the eNBs 802 and the S5-U interface towards the P-GW 210. The consolidated WCPP 209 manages the mobility anchor point for both the signaling plane and the user plane in one place. In other words, all S1 functions are terminated in a single node.

When compared to a traditional X2 handover process with S-GW relocation, the WCPP based call flow saves 4 signaling messages overall per procedure, which is about 4/6=~67% saving in the network between the MME 214, the S-GW 212 and the P-GW 210. However, it is a relative saving of 100% from the GW point of view. The MME 214 and the S-GW 212 logics are combined in the consolidated WCPP 209. There is no S-GW selection based on the external DNS information which saves 100% of DNS transactions with the DNS servers. In addition, the DNS NAPTR record size for TAI FQDN and S-GW Canonical Name should be reduced significantly (estimated to be more than about 70%). The mobility contexts and the session contexts are shared within the consolidated WCPP 209 among call processing components. The consolidated WCPP 209 manages the access bearer establishments and virtual S-GW 212 resource allocation. The consolidated WCPP 209 handles the S1-U interface towards the eNBs 802 and the S5-U interface towards the P-GW 810. The consolidated WCPP 209 manages the mobility anchor point for both the signaling plane and the user plane in one place. In other words, all S1 functions are terminated in a single node.

Figure 9:
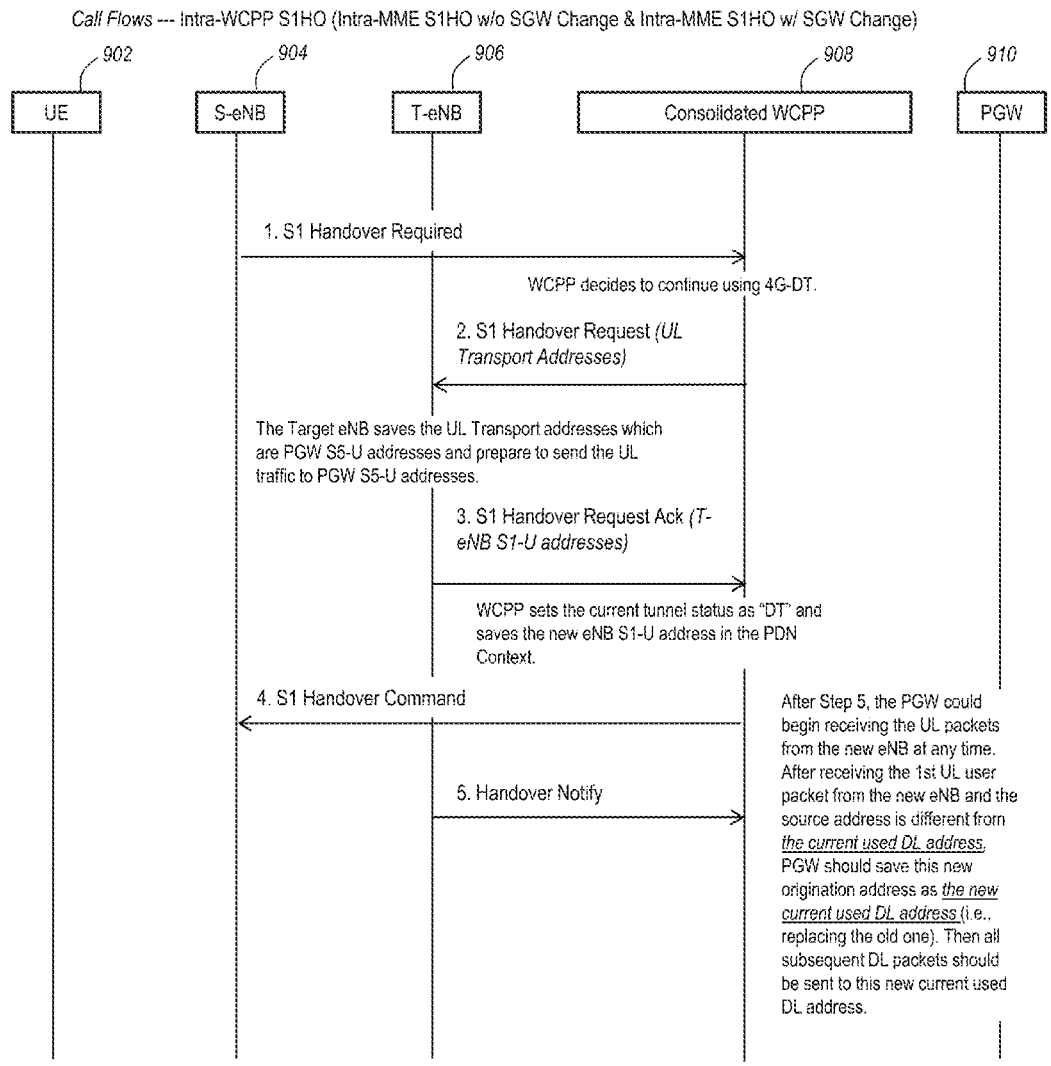
FIG. 9 depicts an illustrative embodiment of an intra-consolidated control plane node S1 handover call flow.

FIG. 9 depicts an illustrative embodiment of an example call flow associated with an intra-consolidated control plane node S1 handover process 900. Messages are exchanged between one or more of a UE 902, an S-eNB 904, a T-eNB 906, a consolidated WCPP 908, and a P-GW 910. A single message exchange 900 is sufficient; whereas, a legacy Intra-MME S1 handover would require two separate versions, depending upon whether the inter-MME S1 handover requires a S-GW change or not.

When compared to a traditional Intra-MME S1 handover without S-GW relocation, the WCPP based call flow 900 saves two signaling messages overall per procedure, which is about 2/7=~28% saving in the network between the MME 214, the S-GW 212 and the P-GW 210. However, it is a relative saving of 100% from the P-GW 210 point of view. The MME 214 and the S-GW 212 logics are combined in the consolidated WCPP 209. There is no S-GW selection based on the external DNS information which saves 100% of DNS transactions with the DNS servers. In addition, the DNS NAPTR record size for TAI FQDN and S-GW Canonical Name should be reduced significantly (estimated more than 70%). The mobility contexts and the session contexts are shared within the WCPP among call processing components. The consolidated WCPP 209 manages the access bearer establishments and virtual S-GW resource allocation. The consolidated WCPP 209 also handles the S1-U interface towards the eNBs 902 and the S5-U interface towards the P-GW 910. The consolidated WCPP 209 manages a mobility anchor point for both the signaling plane and the user plane in one place. In other words, all S1 functions are terminated in a single node.

When compared to a traditional Intra-MME S1 handover with S-GW relocation, the WCPP based call flow 900 saves six signaling messages overall per procedure, which is about 6/11=~54% saving in the network between the MME 214, the S-GW 212 and the P-GW 910. However, it is a relative saving of 100% from the P-GW 910 point of view. The MME 214 and the S-GW 212 logics are combined in the consolidated WCPP 209. There is no S-GW relocation based on the external DNS information which saves 100% of DNS transactions with the DNS servers. In addition, the DNS NAPTR record size for TAI FQDN and S-GW Canonical Name are reduced significantly (estimated more than 70%). The mobility contexts and the session contexts are shared within the consolidated WCPP 209 among call processing components. The consolidated WCPP 209 manages the access bearer establishments and virtual S-GW resource allocation. The consolidated WCPP 209 handles an S1-U interface towards the eNBs 902 and an S5-U interface towards the P-GW 910. The consolidated WCPP 209 manages a mobility anchor point for both the signaling plane and the user plane in one place. In other words, all S1 functions are terminated in a single node.

Figure 10A:
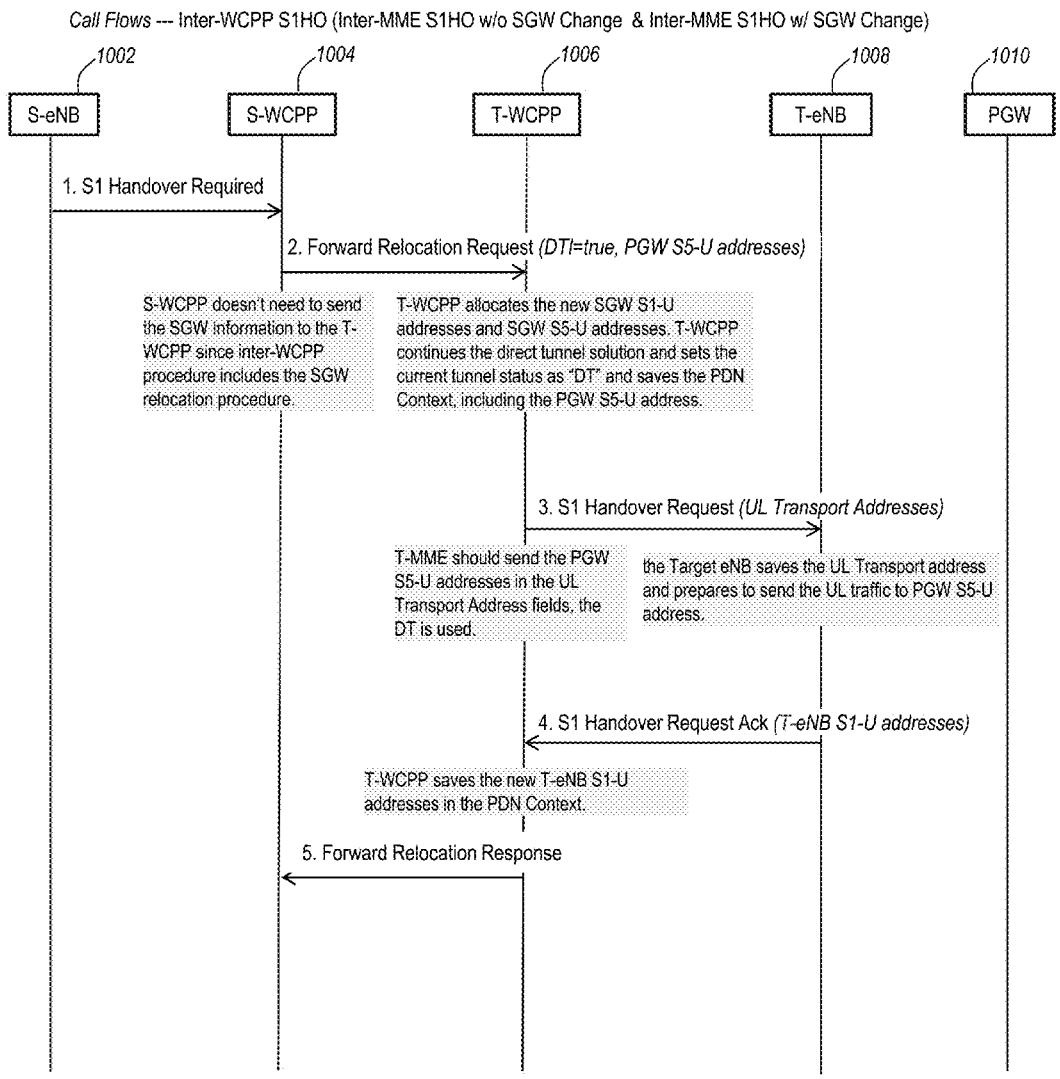
FIGS. 10A & 10B depicts an illustrative embodiment of an inter-consolidated control plane node S1 handover call flow.
Figure 10B:
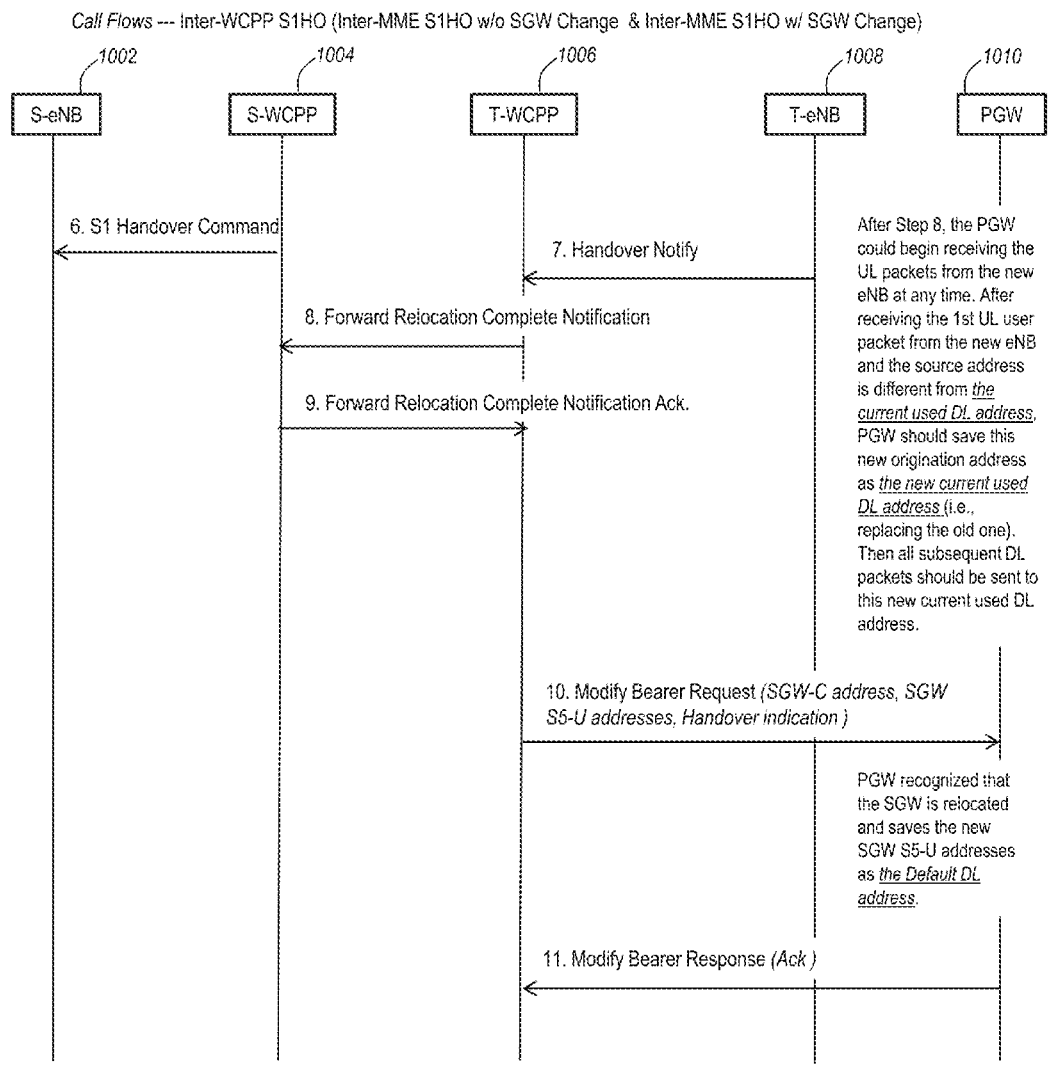

FIGS. 10A & 10B depicts an illustrative embodiment of an example call flow associated with an inter-consolidated control plane node S1 handover process 1000a, 1000b, collectively 1000. Messages are exchanged between one or more of a an S-eNB 1004, a Serving consolidated WCPP (S-WCPP) 1004, a Target consolidated WCPP (T-WCPP) 1006, a T-eNB 1008, and a P-GW 1010. A single message exchange 1000a, 1000b is sufficient; whereas, a legacy Inter-MME S1 handover would require two separate versions, depending upon whether the inter-MME S1 handover requires a S-GW change or not. The call flows illustrated above do not reflect interaction with the MSC 130, 230 over the S-GW interface, since the consolidated WCPP implementation does not change the behaviors on the S-GW interface.

When compared to a traditional Inter MME S1 handover without S-GW relocation, there is no signaling message saving in the network between the MME 214, the S-GW 212 and the P-GW 210. For the inter-WCPP procedure, the S-GW 212 relocation is always happening. The MME 214 and the S-GW 212 logics are combined in the consolidated WCPP 209. There is no S-GW selection based on the external DNS information which saves 100% of DNS transactions with the DNS servers. In addition, the DNS NAPTR record size for TAI FQDN and S-GW Canonical Name should be reduced significantly (estimated more than 70%). The mobility contexts and the session contexts are shared within the consolidated WCPP 209 among call processing components. The consolidated WCPP 209 manages the access bearer establishments and virtual S-GW resource allocation. The consolidated WCPP 209 handles an S1-U interface towards the eNBs and an S5-U interface towards the P-GW 1010. The consolidated WCPP 209 manages a mobility anchor point for both the signaling plane and the user plane in one place. In other words, all S1 functions are terminated in a single node.

When compared to a traditional Inter MME S1 handover with S-GW relocation, the WCPP based call flow 1000 saves four signaling messages overall per procedure, which is about 4/15=~27% saving in the network between the MME 214, the S-GW 212 and the P-GW 210. However, it is a relative saving of 66% from the P-GW 210 point of view. The MME 214 and the S-GW 212 logics are combined in the consolidated WCPP 209. There is no S-GW selection based on the external DNS information which saves 100% of DNS transactions with the DNS servers. In addition, the DNS NAPTR record size for TAI FQDN and S-GW Canonical Name is reduced significantly (estimated more than 70%). The mobility contexts and the session contexts are shared within the consolidated WCPP 209 among call processing components. The consolidated WCPP 209 manages the access bearer establishments and virtual S-GW resource allocation. The consolidated WCPP 209 handles the S1-U interface towards the eNBs and the S5-U interface towards the P-GW 1010. The consolidated WCPP 209 manages a mobility anchor point for both the signaling plane and the user plane in one place. In other words, all S1 functions are terminated in a single node.

Figure 11:
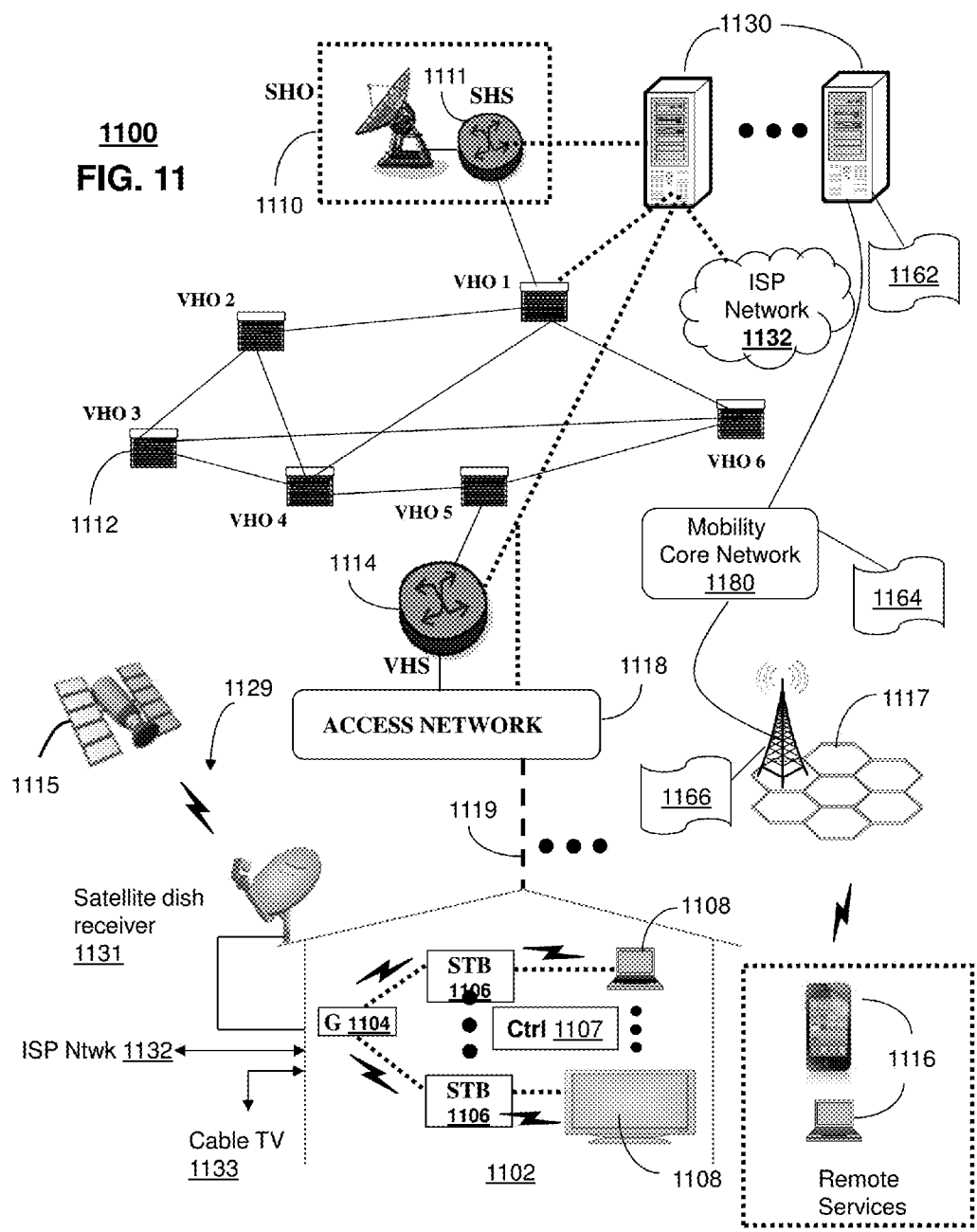
FIGS. 11-12 depict illustrative embodiments of communication systems that provide media services according to the system of FIG. 2 and the call flows of FIGS. 4A-10B.

FIG. 11 depicts an illustrative embodiment of a first communication system 1100 for delivering media content. The communication system 1100 can represent an Internet Protocol Television (IPTV) media system. Communication system 1100 can be overlaid or operably coupled with the systems 100, 200 of FIGS. 1 and/or 2 as another representative embodiment of communication system 1100. For instance, one or more devices illustrated in the communication system 1100 of FIG. 11 communicates signaling message traffic with the base station 1117 of a radio access network in communication with the mobile communication device 1116. The signaling message traffic includes information associated with one of mobility management processing, bearer management or both of a packet core network. Bearer message traffic is communicated with the base station 1117 and a data packet is communicated between the base station 1117 and an external packet data network via a gateway by way of the bearer message traffic.

The IPTV media system can include a super head-end office (SHO) 1110 with at least one super headend office server (SHS) 1111 which receives media content from satellite and/or terrestrial communication systems. In the present context, media content can represent, for example, audio content, moving image content such as 2D or 3D videos, video games, virtual reality content, still image content, and combinations thereof. The SHS server 1111 can forward packets associated with the media content to one or more video head-end servers (VHS) 1114 via a network of video head-end offices (VHO) 1112 according to a multicast communication protocol.

The VHS 1114 can distribute multimedia broadcast content via an access network 1118 to commercial and/or residential buildings 1102 housing a gateway 1104 (such as a residential or commercial gateway). The access network 1118 can represent a group of digital subscriber line access multiplexers (DSLAMs) located in a central office or a service area interface that provide broadband services over fiber optical links or copper twisted pairs 1119 to buildings 1102. The gateway 1104 can use communication technology to distribute broadcast signals to media processors 1106 such as Set-Top Boxes (STBs) which in turn present broadcast channels to media devices 1108 such as computers or television sets managed in some instances by a media controller 1107 (such as an infrared or RF remote controller).

The gateway 1104, the media processors 1106, and media devices 1108 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 1106 and subsystems of the IPTV media system for services such as video-on-demand (VoD), browsing an electronic programming guide (EPG), or other infrastructure services.

A satellite broadcast television system 1129 can be used in the media system of FIG. 11. The satellite broadcast television system can be overlaid, operably coupled with, or replace the IPTV system as another representative embodiment of communication system 1100. In this embodiment, signals transmitted by a satellite 1115 that include media content can be received by a satellite dish receiver 1131 coupled to the building 1102. Modulated signals received by the satellite dish receiver 1131 can be transferred to the media processors 1106 for demodulating, decoding, encoding, and/or distributing broadcast channels to the media devices 1108. The media processors 1106 can be equipped with a broadband port to an Internet Service Provider (ISP) network 1132 to enable interactive services such as VoD and EPG as described above.

In yet another embodiment, an analog or digital cable broadcast distribution system such as cable TV system 1133 can be overlaid, operably coupled with, or replace the IPTV system and/or the satellite TV system as another representative embodiment of communication system 1100. In this embodiment, the cable TV system 1133 can also provide Internet, telephony, and interactive media services. System 1100 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 1130, a portion of which can operate as a web server for providing web portal services over the ISP network 1132 to wireline media devices 1108 or wireless communication devices 1116.

Communication system 1100 can also provide for all or a portion of the computing devices 1130 to function as a consolidated wireless control plane platform (herein referred to as consolidated wireless control plane platform 1130). The consolidated wireless control plane platform 1130 can use computing and communication technology to perform function 1162, which can include among other things, the wireless mobility techniques described by the processes 300-1000 of FIGS. 3A-10. For instance, function 1162 of the consolidated wireless control plane platform 1130 can be similar to the functions described for the consolidated WCPP 209 of FIG. 2 in accordance with the process 1000

(FIG. 10). Likewise, the function 1166 of wireless communication devices 1116 can be similar to the functions described for the UE 201 of FIG. 2 in accordance with processes 300-900 of FIGS. 4A-10B and/or the process 300 of FIG. 3.

Multiple forms of media services can be offered to media devices over landline technologies such as those described above. Additionally, media services can be offered to media devices by way of a wireless access base station 1117 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 12:
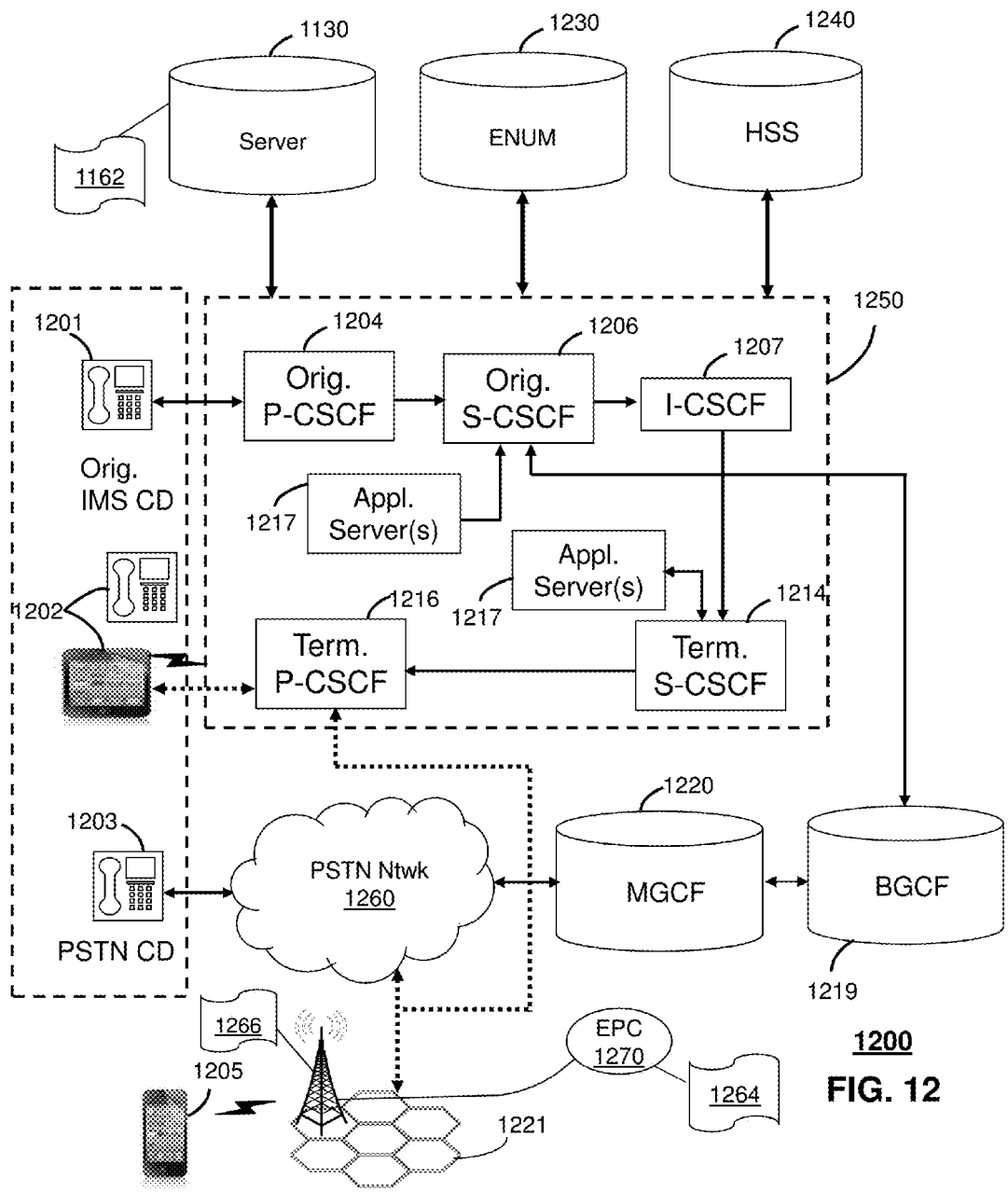

FIG. 12 depicts an illustrative embodiment of a communication system 1200 employing an IP Multimedia Subsystem (IMS) network architecture to facilitate the combined services of circuit-switched and packet-switched systems. Communication system 1200 can be overlaid or operably coupled with system 100, 200 of FIGS. 1 and/or 2 and communication system 1100 as another representative embodiment of communication system 1100. The system 1100 communicates signaling message traffic with a base station 1221 of a radio access network in communication with a mobile communication device 1205. The signaling message traffic includes information associated with one of mobility management processing, bearer management or both of a packet core network. Bearer message traffic is communicated with the base station 1221 and a data packet is communicated between the base station 1221 and an external packet data network via a gateway by way of the bearer message traffic.

Communication system 1200 can comprise a Home Subscriber Server (HSS) 1240, a tElephone NUmber Mapping (ENUM) server 1230, and other network elements of an IMS network 1250. The IMS network 1250 can establish communications between IMS-compliant communication devices (CDs) 1201, 1202, Public Switched Telephone Network (PSTN) CDs 1203, 1205, and combinations thereof by way of a Media Gateway Control Function (MGCF) 1220 coupled to a PSTN network 1260. The MGCF 1220 need not be used when a communication session involves IMS CD to IMS CD communications. A communication session involving at least one PSTN CD may utilize the MGCF 1220.

IMS CDs 1201, 1202 can register with the IMS network 1250 by contacting a Proxy Call Session Control Function (P-CSCF) which communicates with an interrogating CSCF (I-CSCF), which in turn, communicates with a Serving CSCF (S-CSCF) to register the CDs with the HSS 1240. To initiate a communication session between CDs, an originating IMS CD 1201 can submit a Session Initiation Protocol (SIP INVITE) message to an originating P-CSCF 1204 which communicates with a corresponding originating S-CSCF 1206. The originating S-CSCF 1206 can submit the SIP INVITE message to one or more application servers (ASs) 1217 that can provide a variety of services to IMS subscribers.

For example, the application servers 1217 can be used to perform originating call feature treatment functions on the calling party number received by the originating S-CSCF 1206 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 1206 can submit queries to the ENUM system 1230 to translate an E.164 telephone number in the SIP INVITE message to a SIP Uniform Resource Identifier (URI) if the terminating communication device is IMS-compliant. The SIP URI can be used by an Interrogating CSCF (I-CSCF) 1207 to submit a query to the HSS 1240 to identify a terminating S-CSCF 1214 associated with a terminating IMS CD such as reference 1202. Once identified, the I-CSCF 1207 can submit the SIP INVITE message to the terminating S-CSCF 1214. The terminating S-CSCF 1214 can then identify a terminating P-CSCF 1216 associated with the terminating CD 1202. The P-CSCF 1216 may then signal the CD 1202 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 12 may be interchangeable. It is further noted that communication system 1200 can be adapted to support video conferencing. In addition, communication system 1200 can be adapted to provide the IMS CDs 1201, 1202 with the multimedia and Internet services of communication system 1100 of FIG. 11.

If the terminating communication device is instead a PSTN CD such as CD 1203 or CD 1205 (in instances where the cellular phone only supports circuit-switched voice communications), the ENUM system 1230 can respond with an unsuccessful address resolution which can cause the originating S-CSCF 1206 to forward the call to the MGCF 1220 via a Breakout Gateway Control Function (BGCF) 1219. The MGCF 1220 can then initiate the call to the terminating PSTN CD over the PSTN network 1260 to enable the calling and called parties to engage in voice and/or data communications.

It is further appreciated that the CDs of FIG. 12 can operate as wireline or wireless devices. For example, the CDs of FIG. 12 can be communicatively coupled to a cellular base station 1221, a femtocell, a WiFi router, a Digital Enhanced Cordless Telecommunications (DECT) base unit, or another suitable wireless access unit to establish communications with the IMS network 1250 of FIG. 12. The cellular access base station 1221 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 12.

Cellular phones supporting LTE can support packet-switched voice and packet-switched data communications and thus may operate as IMS-compliant mobile devices. In this embodiment, the cellular base station 1221 may communicate directly with the IMS network 1250 as shown by the arrow connecting the cellular base station 1221 and the P-CSCF 1216.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The consolidated wireless control plane platform 1130 of FIG. 11 can be operably coupled to communication system 1200 for purposes similar to those described above. The consolidated wireless control plane platform 1130 can perform function 1162 and thereby provide wireless mobility services to the CDs 1201, 1202, 1203 and 1205 of FIG. 12, similar to the functions described for the consolidated WCPP 209 of FIG. 2 in accordance with processes 300 of FIG. 3, and the signal flows 400-1000 of FIGS. 4A-10B. The base station 1221 and/or the core network nodes 1270, can be adapted with software to perform functions 1266 and 1264, respectively to perform the latency sensitive functions described in accordance with one or more of the processes 300 of FIG. 3, and the signal flows 400-1000 of FIGS. 4A-10B.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 13:
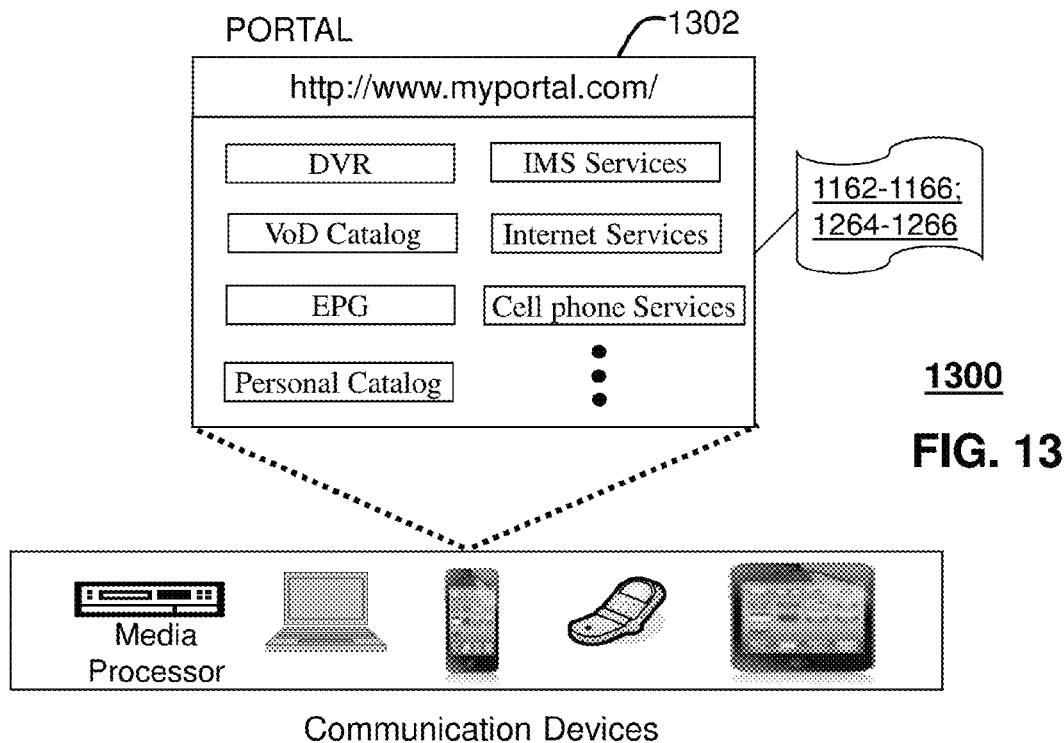
FIG. 13 depicts an illustrative embodiment of a web portal for interacting with the communication systems of according to the system of FIG. 2 and the call flows of FIGS. 4A-10B.

FIG. 13 depicts an illustrative embodiment of a web portal 1302 of a communication system 1300. Communication system 1300 can be overlaid or operably coupled with the systems 100, 200 of FIGS. 1 and/or 2, communication system 1100 (FIG. 11), and/or communication system 1200 (FIG. 12) as another representative embodiment of systems 100, 200 of FIGS. 1 and/or 2, communication system 1100, and/or communication system 1200. The web portal 1302 can be used for managing services of systems 100, 200 of FIGS. 1 and/or 2 and communication systems 1100-1200 of FIGS. 11 and/or 12. A web page of the web portal 1302 can be accessed by a Uniform Resource Locator (URL) with an Internet browser using an Internet-capable communication device such as those described in FIGS. 1 and/or 2 and FIGS. 11 and/or 12. The web portal 1302 can be configured, for example, to access a media processor 1106 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 1106. The web portal 1302 can also be used for provisioning IMS services described earlier, provisioning Internet services, provisioning cellular phone services, and so on.

The web portal 1302 can further be utilized to manage and provision software applications 1162-1166, and 1264-1266 to adapt these applications as may be desired by subscribers and/or service providers of systems 100, 200 of FIGS. 1 and/or 2, and communication systems 1100-1200, of FIGS. 11 and/or 12. For instance, users of the services provided by consolidated WCPP 209 (FIG. 2) or consolidated wireless control plane platform 1130 (FIG. 11) can log into their on-line accounts and provision the servers 110 or consolidated wireless control plane platform 1130 with rules associated with establishing bearers, managing UE mobility, maintaining, updating or otherwise managing a virtual machine and/or virtualized network functions, user profiles, configuration profiles, information supporting the virtualized network functionality, e.g., to provide contact information to the consolidated WCPP 209 (FIG. 2) to enable it to communication with devices described in FIGS. 1-2, and 11-15, and so on. Service providers can log onto an administrator account to provision, monitor and/or maintain the systems 100, 200 of FIGS. 1 and/or 2 or the consolidated wireless control plane platform 1130 of FIG. 11.

Figure 14:
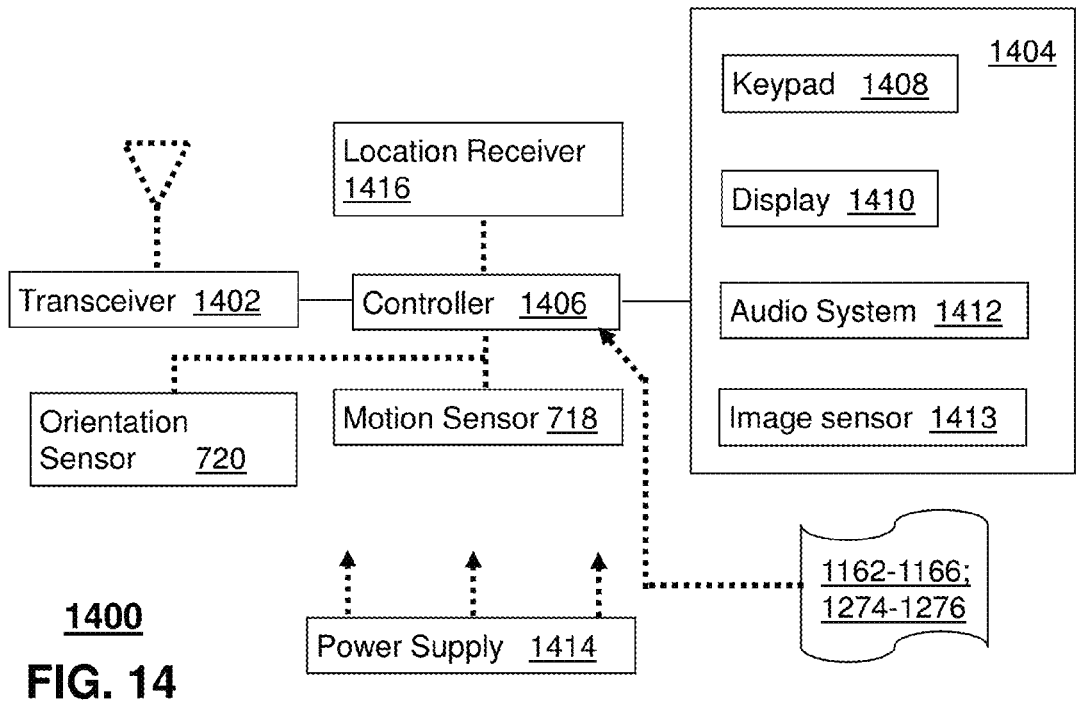
FIG. 14 depicts an illustrative embodiment of a communication device.

FIG. 14 depicts an illustrative embodiment of a communication device 1400. Communication device 1400 can serve in whole or in part as an illustrative embodiment of the devices depicted in FIGS. 1 and/or 2, and FIGS. 2-9 and/or 11-12 and can be configured to perform portions of the process 1000 of FIG. 10.

Communication device 1400 can comprise a wireline and/or wireless transceiver 1402 (herein transceiver 1402), a user interface (UI) 1404, a power supply 1414, a location receiver 1416, a motion sensor 1418, an orientation sensor 1420, and a controller 1406 for managing operations thereof. The transceiver 1402 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 1402 can also be adapted to support circuit-switched wireline access technologies (such as PSTN), packet-switched wireline access technologies (such as TCP/IP, VoIP, etc.), and combinations thereof.

The UI 1404 can include a depressible or touch-sensitive keypad 1408 with a navigation mechanism such as a roller ball, a joystick, a mouse, or a navigation disk for manipulating operations of the communication device 1400. The keypad 1408 can be an integral part of a housing assembly of the communication device 1400 or an independent device operably coupled thereto by a tethered wireline interface (such as a USB cable) or a wireless interface supporting for example Bluetooth®. The keypad 1408 can represent a numeric keypad commonly used by phones, and/or a QWERTY keypad with alphanumeric keys. The UI 1404 can further include a display 1410 such as monochrome or color LCD (Liquid Crystal Display), OLED (Organic Light Emitting Diode) or other suitable display technology for conveying images to an end user of the communication device

1400. In an embodiment where the display 1410 is touch-sensitive, a portion or all of the keypad 1408 can be presented by way of the display 1410 with navigation features.

The display 1410 can use touch screen technology to also serve as a user interface for detecting user input. As a touch screen display, the communication device 1400 can be adapted to present a user interface with graphical user interface (GUI) elements that can be selected by a user with a touch of a finger. The touch screen display 1410 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1410 can be an integral part of the housing assembly of the communication device 1400 or an independent device communicatively coupled thereto by a tethered wireline interface (such as a cable) or a wireless interface.

The UI 1404 can also include an audio system 1412 that utilizes audio technology for conveying low volume audio (such as audio heard in proximity of a human ear) and high volume audio (such as speakerphone for hands free operation). The audio system 1412 can further include a microphone for receiving audible signals of an end user. The audio system 1412 can also be used for voice recognition applications. The UI 1404 can further include an image sensor 1413 such as a charged coupled device (CCD) camera for capturing still or moving images.

The power supply 1414 can utilize common power management technologies such as replaceable and rechargeable batteries, supply regulation technologies, and/or charging system technologies for supplying energy to the components of the communication device 1400 to facilitate long-range or short-range portable applications. Alternatively, or in combination, the charging system can utilize external power sources such as DC power supplied over a physical interface such as a USB port or other suitable tethering technologies.

The location receiver 1416 can utilize location technology such as a global positioning system (GPS) receiver capable of assisted GPS for identifying a location of the communication device 1400 based on signals generated by a constellation of GPS satellites, which can be used for facilitating location services such as navigation. The motion sensor 1418 can utilize motion sensing technology such as an accelerometer, a gyroscope, or other suitable motion sensing technology to detect motion of the communication device 1400 in three-dimensional space. The orientation sensor 1420 can utilize orientation sensing technology such as a magnetometer to detect the orientation of the communication device 1400 (north, south, west, and east, as well as combined orientations in degrees, minutes, or other suitable orientation metrics).

The communication device 1400 can use the transceiver 1402 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 1406 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1400.

Other components not shown in FIG. 14 can be used in one or more embodiments of the subject disclosure. For instance, the communication device 1400 can include a reset button (not shown). The reset button can be used to reset the controller 1406 of the communication device 1400. In yet another embodiment, the communication device 1400 can also include a factory default setting button positioned, for example, below a small hole in a housing assembly of the communication device 1400 to force the communication device 1400 to re-establish factory settings. In this embodiment, a user can use a protruding object such as a pen or paper clip tip to reach into the hole and depress the default setting button. The communication device 1400 can also include a slot for adding or removing an identity module such as a Subscriber Identity Module (SIM) card. SIM cards can be used for identifying subscriber services, executing programs, storing subscriber data, and so forth.

The communication device 1400 as described herein can operate with more or less of the circuit components shown in FIG. 14. These variant embodiments can be used in one or more embodiments of the subject disclosure.

The communication device 1400 can be adapted to perform the functions of devices of FIGS. 1 and/or 2, the media processor 1106, the media devices 1108, or the portable communication devices 1116 of FIG. 11, as well as the IMS CDs 1201-1202 and PSTN CDs 1203-1205 of FIG. 12. It will be appreciated that the communication device 1400 can also represent other devices that can operate in systems 100, 200 of FIGS. 1 and/or 2, communication systems 1100-1200 of FIGS. 11 and/or 12 such as a gaming console and a media player. In addition, the controller 1406 can be adapted in various embodiments to perform the functions 1162-1166 and 1264-1266, respectively.

Upon reviewing the aforementioned embodiments, it would be evident to an artisan with ordinary skill in the art that said embodiments can be modified, reduced, or enhanced without departing from the scope of the claims described below. For example, in some embodiments, some or all of the base station portions of the RAN 203, i.e., the eNB 202, the HeNB 206, the AP 208 and the NB 204 can be merged into the consolidated WCPP 209, as well. For example, one or more of the base station portions 203, 206, 208, 204 can be incorporated into the RAN/access aggregation portion 260. It is generally understood that the nodal functions of the consolidated WCPP 209 communicated with a multitude of base station portions 203, 206, 208, 204, e.g., disbursed across one or more geographic regions or markets, so consolidation with any one base station portion could serve as a measure of convenience should any portion of the consolidated WCPP 209 happen to be collocated with the consolidated base station portion. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 15:
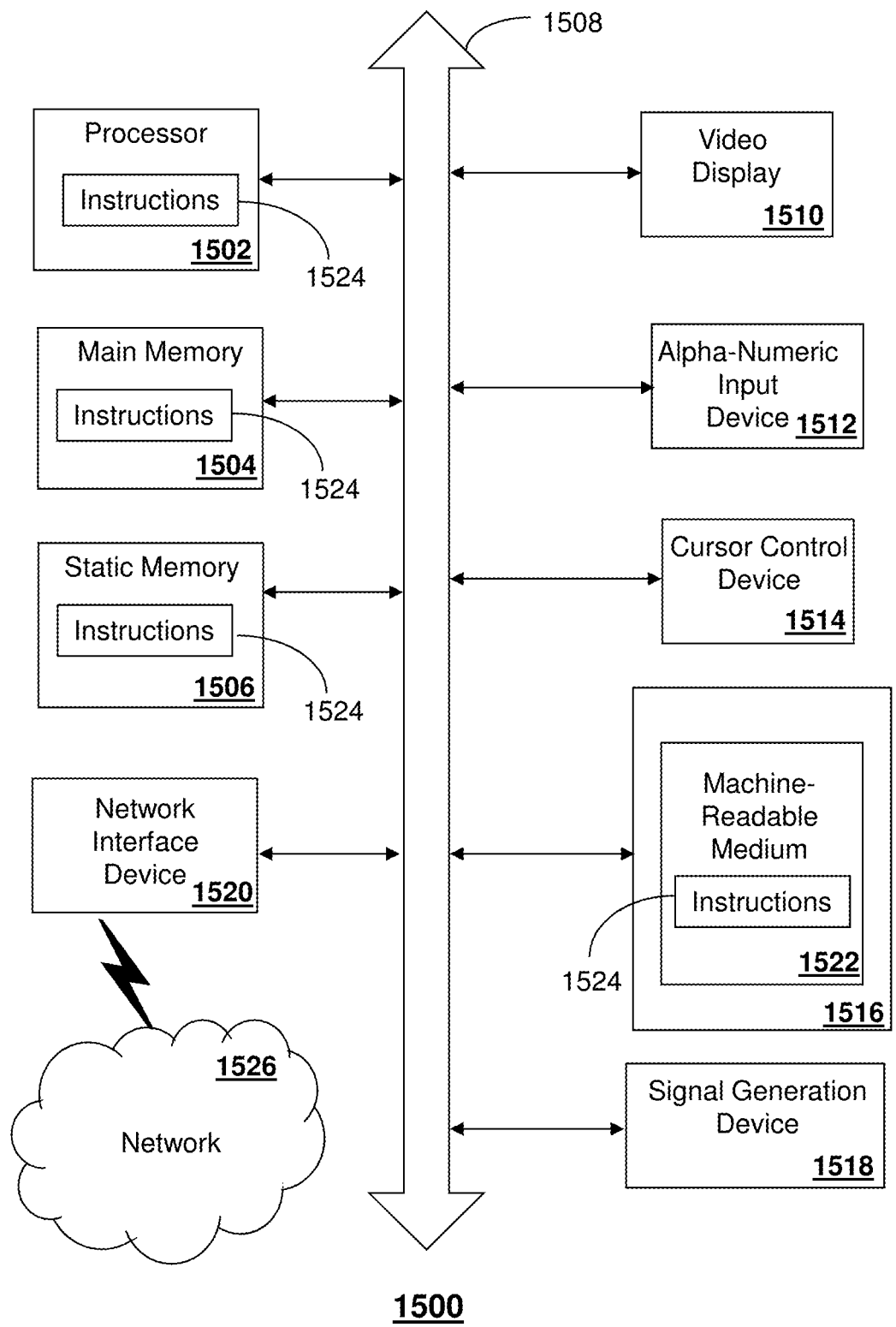
FIG. 15 is a diagrammatic representation of a machine in the form of a computer system within which a set of instructions, when executed, may cause the machine to perform any one or more of the methods described herein.

FIG. 15 depicts an exemplary diagrammatic representation of a machine in the form of a computer system 1500 within which a set of instructions, when executed, may cause the machine to perform any one or more of the methods described above. One or more instances of the machine 1500 can operate, for example, as the consolidated WCPP 209, the portions 260, 250, 270 of the consolidated WCPP 209, the UE 101, 201 and the other nodal functions and devices of FIGS. 1 and 2. In some embodiments, the machine may be connected (e.g., using a network 1526) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1500 may include a processor (or controller) 1502 (e.g., a central processing unit (CPU)), a graphics processing unit (GPU, or both), a main memory 1504 and a static memory 1506, which communicate with each other via a bus 1508. The computer system 1500 may further include a display unit 1510 (e.g., a liquid crystal display (LCD), a flat panel, or a solid state display). The computer system 1500 may include an input device 1512 (e.g., a keyboard), a cursor control device 1514 (e.g., a mouse), a disk drive unit 1516, a signal generation device 1518 (e.g., a speaker or remote control) and a network interface device 1520. In distributed environments, the embodiments described in the subject disclosure can be adapted to utilize multiple display units 1510 controlled by two or more computer systems 1500. In this configuration, presentations described by the subject disclosure may in part be shown in a first of the display units 1510, while the remaining portion is presented in a second of the display units 1510.

The disk drive unit 1516 may include a tangible computer-readable storage medium 1522 on which is stored one or more sets of instructions (e.g., software 1524) embodying any one or more of the methods or functions described herein, including those methods illustrated above. The instructions 1524 may also reside, completely or at least partially, within the main memory 1504, the static memory 1506, and/or within the processor 1502 during execution thereof by the computer system 1500. The main memory 1504 and the processor 1502 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1522 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1500.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device comprising:
    a processor; and
    a memory storing executable instructions that, when executed by the processor, perform operations comprising:
        communicating signaling message traffic to a base station of a radio access network in communication with a mobile communication device, wherein the signaling message traffic comprises information associated with one of mobility management processing, bearer management, or both of an evolved packet core;
        determining whether the signaling message traffic is related to a first service or a second service; and
        controlling an exchange of data packets, that are to or from the mobile communication device, between the base station and an external packet data network via a gateway, wherein the controlling comprises providing a bearer, for the data packets that are exchanged, having a higher bandwidth characteristic selected from a group of bandwidth characteristics that include a lower bandwidth characteristic and the higher bandwidth characteristic, and wherein the bearer having the higher bandwidth characteristic is provided responsive to a determination that the signaling message traffic relates to the first service.

2. The device of claim 1, wherein the operations further comprise communicating bearer message traffic to the base station, wherein the communicating of the signaling message traffic comprises a mobility management entity function and wherein the communicating of the bearer message traffic comprises a serving gateway function, each of the mobility management entity function and the serving gateway function comprising a respective core logic function of a common virtual machine.

3. The device of claim 2, wherein the signaling message traffic comprises $3^{rd}$ Generation Partnership Protocol, long term evolution (LTE) signaling messages, and wherein the communicating of the signaling message traffic is accomplished without using an S11 interface.

4. The device of claim 1, wherein the operations further comprise one of a probe function, a radio access network analytic function, an access selection function, or a combination thereof.

5. The device of claim 1, wherein the bearer for the data packets that are exchanged has one of a higher quality of service characteristic or a lower quality of service characteristic, wherein the bearer for the data packets that are exchanged has the higher quality of service characteristic responsive to the determination that the signaling message traffic relates to the first service and wherein the bearer for the data packets that are exchanged has the lower quality of service characteristic responsive to a determination that the signaling message traffic relates to the second service.

6. The device of claim 1, wherein the bearer for the data packets that are exchanged has the lower bandwidth characteristic responsive to a determination that the signaling message traffic relates to the second service.

7. The device of claim 1, wherein the first service is one of a streaming media service or a voice over IP service and the second service is an SMS service.

8. The device of claim 1, wherein the gateway comprises a packet data network gateway; and wherein the operations further comprise combining more than one of a radio network controller functionality, a femtocell gateway functionality and a home eNodeB gateway functionality.

9. A method comprising:
communicating, by a network device including a processor, control signals to a base station of a radio access network in communication with a mobile device, wherein the control signals include information associated with one of mobility of the mobile device, bearer management, or both;
determining whether the control signals are related to a first service or a second service; and
coordinating by the network device an exchange of data packets, that are to or from the mobile device, between the base station and an external packet data network, wherein the coordinating comprises providing a bearer, for the data packets that are exchanged, having a stricter latency tolerance selected from a group of latency tolerances that include a less strict latency tolerance and the stricter latency tolerance, and wherein the bearer having the stricter latency tolerance is provided responsive to a determination that the control signals relate to the first service.

10. The method of claim 9, further comprising communicating, by the network device, bearer message traffic to the base station, wherein the communicating of the control signals comprises a mobility management entity function and wherein the communicating of the bearer message traffic comprises a serving gateway function, each of the mobility management entity function and the serving gateway function comprising a respective core logic function of a common virtual machine.

11. The method of claim 9, further comprising:
receiving, by the network device, other control signals from the base station, and
wherein the communicating of the control signals and the other control signals comprises using multiple different standard logical interfaces.

12. The method of claim 9, further comprising combining, by the network device, more than one of a radio network controller functionality, a femtocell gateway functionality and a home eNodeB gateway functionality.

13. The method of claim 9, wherein the bearer for the data packets that are exchanged has one of a higher quality of service characteristic or a lower quality of service characteristic, wherein the bearer for the data packets that are exchanged has the higher quality of service characteristic responsive to the determination that the control signals relate to the first service and wherein the bearer for the data packets that are exchanged has the lower quality of service characteristic responsive to a determination that the control signals relate to the second service.

14. The method of claim 9, wherein the communicating of the control signals comprises universal mobile telecommunications system control signals and long term evolution control signals.

15. A machine-readable storage medium comprising executable instructions which, responsive to being executed by a system including a processor, cause the system to perform operations comprising:
communicating control information to a wireless access terminal, wherein the control information comprises information associated with one of mobility management processing, bearer management, or both of a mobile communication device in communication with the wireless access terminal;
determining whether the control information is related to a first service, that is one of a streaming media service or a voice over IP service, or a second service, that is different from the first service; and
coordinating an exchange of data, that is to or from the mobile communication device, between the wireless access terminal and an external packet data network, wherein the coordinating comprises providing a bearer, for the data that is exchanged, having a higher bandwidth characteristic selected from a group of bandwidth characteristics that include a lower bandwidth characteristic and the higher bandwidth characteristic, and wherein the bearer having the higher bandwidth characteristic is provided responsive to a determination that the control information relates to the first service.

16. The machine-readable storage medium of claim 15, wherein the operations further comprise communicating the data, wherein the communicating of the control information comprises a mobility management entity function and wherein the communicating of the data comprises a serving gateway function, each of the mobility management entity function and the serving gateway function comprising a respective core logic function of a common virtual machine.

17. The machine-readable storage medium of claim 15, wherein the communicating of the control information is accomplished without using an S11 interface.

18. The machine-readable storage medium of claim 15, wherein:
the operations further comprise receiving, from the wireless access terminal, other control information, other data, or both; and
the operations further comprise one of a probe function, a radio access network analytic function, an access selection function, or a combination thereof.

19. The machine-readable storage medium of claim 15, wherein the operations further comprise combining more than one of a radio network controller functionality, a femtocell gateway functionality, and a home eNodeB gateway functionality.

20. The machine-readable storage medium of claim 15, wherein the communicating of the control information comprises universal mobile telecommunications system control information and long term evolution control information.

* * * * *